US009552710B2

(12) United States Patent
Rasband et al.

(10) Patent No.: US 9,552,710 B2
(45) Date of Patent: Jan. 24, 2017

(54) SYSTEMS AND METHODS FOR CUSTOMER DEACTIVATION OF SECURITY ELEMENTS

(71) Applicants: Paul B. Rasband, Lantana, FL (US); Hubert A. Patterson, Boca Raton, FL (US); Stewart E. Hall, Wellington, FL (US); Nancy L. Van Nest, Delray Beach, FL (US); Douglas A. Drew, Boca Raton, FL (US)

(72) Inventors: Paul B. Rasband, Lantana, FL (US); Hubert A. Patterson, Boca Raton, FL (US); Stewart E. Hall, Wellington, FL (US); Nancy L. Van Nest, Delray Beach, FL (US); Douglas A. Drew, Boca Raton, FL (US)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 288 days.

(21) Appl. No.: 14/332,731

(22) Filed: Jul. 16, 2014

(65) Prior Publication Data
US 2015/0009035 A1 Jan. 8, 2015

Related U.S. Application Data

(63) Continuation-in-part of application No. 13/667,688, filed on Nov. 2, 2012.

(51) Int. Cl.
H04N 7/18 (2006.01)
G08B 13/24 (2006.01)
G07G 3/00 (2006.01)

(52) U.S. Cl.
CPC .......... *G08B 13/2454* (2013.01); *G07G 3/003* (2013.01); *G08B 13/246* (2013.01); *H04N 7/188* (2013.01)

(58) Field of Classification Search
None
See application file for complete search history.

(56) References Cited

U.S. PATENT DOCUMENTS 5,635,906 A 6/1997 Joseph
5,777,884 A 7/1998 Belka et al.
(Continued)

FOREIGN PATENT DOCUMENTS

WO 9715031 A1 4/1997
WO 03005313 A2 1/2003

*Primary Examiner* — Heather Jones
(74) *Attorney, Agent, or Firm* — Fox Rothschild LLP; Robert J. Sacco; Carol E. Thorstad-Forsyth

(57) ABSTRACT

Systems (100) and methods (1100) for activating an Electronic Article Surveillance ("EAS") element deactivator. The methods involve: obtaining customer-related data from a customer of a business organization who is attempting to deactivate an EAS element of at least one item; obtaining transaction data contained in a receipt issued upon completion of a checkout transaction for the customer; communicating the customer-related data, transaction data and a unique identifier for an EAS element deactivation system to a remote computing device; processing the customer-related data and transaction data to obtain confirmation that the customer has recently successfully completed the checkout transaction for the item and the EAS element of the item has not yet been deactivated; and activating the EAS element deactivator of the EAS element deactivation system subsequent to when the confirmation is obtained.

20 Claims, 11 Drawing Sheets

(56) References Cited

U.S. PATENT DOCUMENTS

| | | | |
|---|---|---|---|
| 5,814,799 A | 9/1998 | Swartz et al. | |
| 6,169,483 B1 | 1/2001 | Ghaffari et al. | |
| 6,507,279 B2 | 1/2003 | Loof | |
| 6,681,989 B2 | 1/2004 | Bodin | |
| 2002/0186133 A1 | 12/2002 | Loof | |
| 2003/0234288 A1* | 12/2003 | Canipe | G06K 7/10 235/383 |
| 2005/0173527 A1 | 8/2005 | Conzola | |
| 2006/0138220 A1 | 6/2006 | Persky | |
| 2013/0110657 A1* | 5/2013 | Forster | G06Q 20/20 705/17 |
| 2013/0332319 A1* | 12/2013 | Zuber | G06Q 30/0601 705/27.1 |

\* cited by examiner

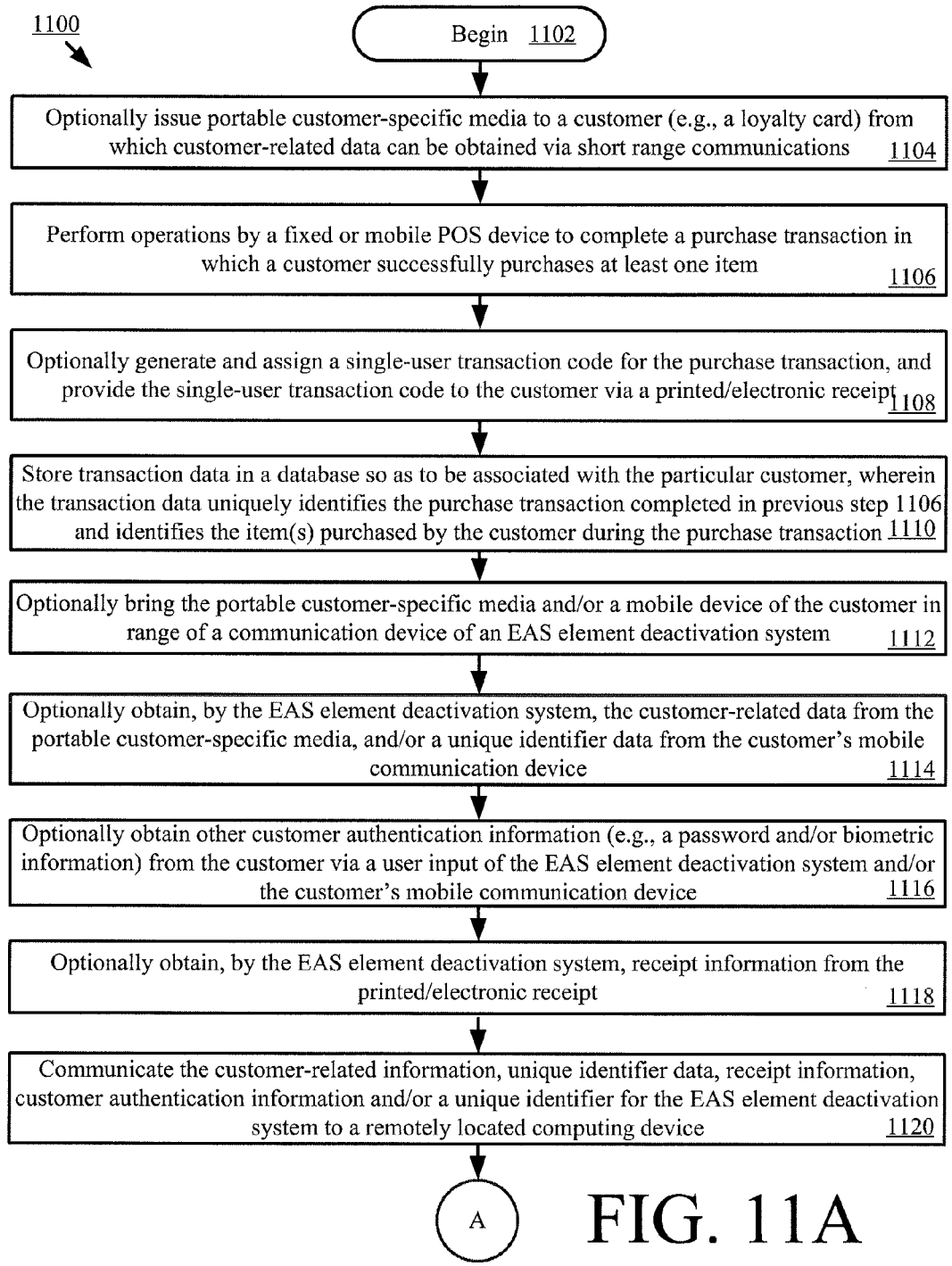

SYSTEMS AND METHODS FOR CUSTOMER DEACTIVATION OF SECURITY ELEMENTS

CROSS-REFERENCE TO RELATED APPLICATIONS

This application is a continuation-in-part application of U.S. patent application Ser. No. 13/667,688 filed on Nov. 2, 2012.

FIELD OF THE INVENTION

The present invention relates to deactivation of security elements, such as an Electronic Article Surveillance ("EAS") element. More particularly, the present invention related to systems and methods for activating an EAS element deactivator in response to customer activities.

BACKGROUND OF THE INVENTION

A typical retail sales transaction occurs at a fixed Point Of Sale ("POS") station manned by a store sales associate. The store sales associate assists a customer with the checkout process by receiving payment for an item. If the item is associated with an EAS element, such as an Acousto-Magnetic ("A-M") tag, the store sales associate deactivates the EAS element after the customer pays for the item. During the transaction, the store sales associate has the opportunity to visually inspect the item and notice whether the item has a price tag with a suspiciously low price.

An item may have a price tag with an unusual low price because the customer has fraudulently switched price tags by replacing the original price tag with a low price tag corresponding to a less expensive item. By noticing the inconsistent price tag, the store sales associate has the opportunity to prevent the fraud and determine the correct price of the item.

While traditional POS stations are advantageous in that they allow a store sales associate to supervise the checkout transaction, in order to control costs, many retailers have implemented self-checkout POS stations that allow a customer to self-checkout. A self-checkout station is not supervised by a store sales associate. In a self-checkout transaction, the customer independently rings up the sale of an item. If the item is associated with an EAS element, a store sales associate deactivates the EAS element attached to the item.

Allowing the customer to self-checkout may be risky. For instance, a customer may wish to buy an expensive item but may not want to pay the full price. The customer may switch the price tag on the expensive item with a much less expensive price tag. The customer may then use a self-checkout POS station to pay. After payment is completed, a store sales associate may use an EAS element deactivator tool to deactivate the EAS element associated with the item. Once the EAS element is deactivated, the customer leaves the store without having paid the full price for the item.

Similarly, if the retail store does not offer a self-checkout POS station, the customer may use a traditional POS station to purchase the item. The store sales associate supervising the transaction at the traditional POS station could be in collusion with the customer and the switched price tag will be intentionally overlooked by the store sales associate, i.e., sweethearting. The store sales associate deactivates the EAS element and the customer leaves the store without having paid the full price for the item.

SUMMARY OF THE INVENTION

The present invention concerns implementing systems and methods for activating an EAS element deactivator. The methods involve obtaining by an EAS element deactivation system (1) customer-related data from a customer of a business organization who is attempting to deactivate an EAS element of at least one item, and/or (2) transaction data contained in a receipt issued upon completion of a checkout transaction for the customer. The customer-related data, transaction data and/or a unique identifier for the EAS element deactivation system are then communicated to a remote computing device. At the remote computing device, the customer-related data and/or transaction data are processed to obtain confirmation that the customer has recently successfully completed the checkout transaction for the item and the EAS element of the item has not yet been deactivated. Subsequent to when the confirmation is obtained, the EAS element deactivator is activated.

In some scenarios, the customer-related data is obtained from portable customer-specific media (e.g., a loyalty card) via a short range communication (e.g., a NFC communication or a magnetic strip read). Additionally or alternatively, the customer-related data comprises a unique identifier assigned to a mobile communication device possessed by the customer. The transaction data may comprise a single-use transaction code uniquely identifying the purchase transaction. The single-use transaction code can be generated as a function of customer-related data, business-related data, or time-related data, and/or in accordance with a pseudo random or chaotic number generation algorithm.

In these or other scenarios, the methods further involve performing the following steps when the confirmation is obtained: providing first item identification data specifying items approved for deactivation by the customer from the remote computing device to the EAS element deactivation system; obtaining second item identification data from an item possessed by the customer; and determining if the first item identification data matches the second identification data. If the first and second identification data match each other, then the EAS element deactivator is activated.

DESCRIPTION OF THE DRAWINGS

Embodiments will be described with reference to the following drawing figures, in which like numerals represent like items throughout the figures, and in which:

FIGS. 11A and 11B collectively provide a flow diagram of another exemplary process for activating an EAS element deactivator that is useful for understanding the present invention.

DETAILED DESCRIPTION OF THE INVENTION

Figure 1:
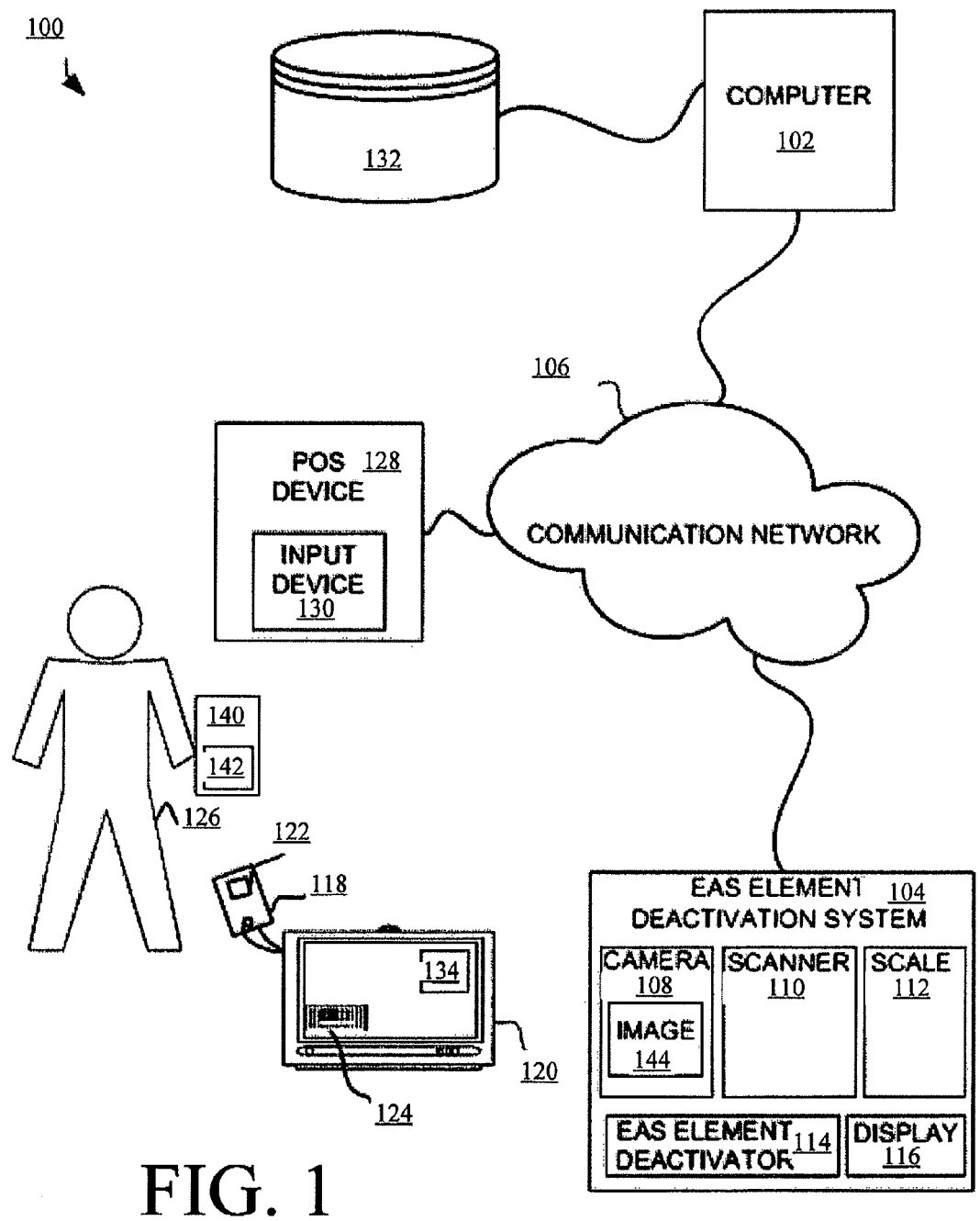
FIG. 1 is a block diagram of an exemplary EAS element deactivation system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As used herein, relational terms, such as "first" and "second," "top" and "bottom," and the like, may be used solely to distinguish one entity or element from another entity or element without necessarily requiring or implying any physical or logical relationship or order between such entities or elements.

In retail stores that have products tagged with security devices, consumers are typically dependent on a sales associate to deactivate the EAS element when the item has been purchased. The deactivation process occurs at the physical POS terminal. Retailers would like to provide a mobile checkout option to reduce the queues of customers lining up at the POS terminals. The mobile checkout option will allow consumers to purchase products and/or check out items in the aisles of a business facility (e.g., a retail store or a library). For retailers who provide a mobile self-checkout smart phone application, consumers may use their smart phones to scan and purchase/checkout products. Retailers may also provide the mobile handheld solution on a table Personal Computer ("PC"). The consumers may use this option to scan and purchase/checkout products. The business organization needs to provide a solution where the consumer may deactivate the EAS element during a mobile checkout. At the same time, the strategies need to prevent the unauthorized use of equipment by customers and others who have not been authenticated for use.

There are several elements to this problem. First, some customers may decide to use the deactivation tools to deactivate EAS element without paying for the items to which the EAS elements are attached. Second, the method to protect the deactivation tool from unauthorized access may make the tool no longer accessible in a convenient and timely way to an authorized customer. Third, the customer's use of the deactivation hardware needs to be correlated with a mobile sales/checkout transaction.

Attempts by others to solve the above problems have been minimal. Deactivation of anti-theft tags and labels is almost always conducted at a normal (or fixed) POS station to which the deactivation tool is physically tied. Furthermore, the deactivation hardware is exclusively used by in-store personnel and sales associates. Handheld devices are sometimes used to deactivate EAS elements, but these devices are not generally secured (beyond the simple act of locking them up when they are not in use). The handheld devices are still typically located at the fixed POS station, and not carried throughout the business facility and/or given to customers for use thereof.

To date, the importance or value of creating advanced authorization and access control methods for mobile deactivation equipment has not been recognized, especially as it pertains to granting access to a customer engaging a mobile MPOS transaction. Some retailers provide the self-checkout lanes, which allow a customer to scan product labels and then tender the transaction on their own. However, no tag deactivation or tag detaching is being performed by the customer.

Embodiments of the present invention will now be described with respect to FIGS. 1-11B. Generally, the present invention provides systems and methods for activating an EAS element deactivator. The methods involve: establishing an EAS element deactivation session for a particular customer; receiving, at an EAS element deactivation system, item data including a physical attribute of an item; determining whether the item data corresponds to a purchased item in a purchase receipt associated with the particular customer; and activating the EAS element deactivator when it is determined that the item data corresponds to the purchased item.

Exemplary Systems for Customer Deactivation of EAS Elements

Referring now to FIG. 1, there is provided a schematic illustration of an exemplary system 100 that is useful for understanding the present invention. System 100 includes a computer 102 in communication with an item database 132 and an EAS element deactivation system 104 via a communication network 106. In some scenarios, the computer 102 may be part of the EAS element deactivation system 104, and/or vice-versa. As such, computer 102 may be remote from or resident with the EAS element deactivation system 104.

EAS element deactivation system 104 is generally configured to deactivate EAS elements 134 attached to items 120 offered for sale or check out by a business organization (e.g., a retail store or library) and/or purchased by a customer 126 of the business organization. The EAS elements 134 can include, but are not limited to, a one bit element, a checkpoint, an RFID element, a NFC element or other element attached to an item that is remotely read. In this regard, the EAS element deactivation system 104 may include, but is not limited to, a deactivation kiosk, a locked cabinet and/or a dedicated self-checkout location in a retail store. In all cases, the EAS element deactivation system 104 may comprise a camera 108, a scanner 110, a scale 112, an EAS element deactivator 114 and/or a display 116. The components 108 and/or 110 can be used to obtain data from the price tags 118, the items 120, e-receipts and/or customer's mobile devices (e.g., mobile phones), which may be used during an EAS element deactivation process. In the e-receipt scenarios, the scanner 110 comprises an optical scanner. Optical scanners are well known in the art, and therefore will not be described herein. The scanner 110 may also comprise a magnetic strip reader and/or other type of communications device (e.g., an RFID reader and/or an RF transceiver).

Accordingly, each price tag 118 has tag data 122 printed directly thereon, affixed thereto via a label (e.g., a barcode label), and/or stored in a data store thereof (e.g., in a data store of a short range communication device). Similarly, each item 120 may have a manufacturer code 124 and/or other item related data printed directly thereon, affixed thereto via a label (e.g., a barcode label), and/or stored in a data store thereof (e.g., in a data store of a short range communication device). The e-receipts may have a barcode included therein in which transaction data is encoded. The customer's mobile device may have a unique identifier associated therewith (e.g., a Media Access Control ("MAC") address) by which the customer can be identified. The data obtained from the price tag 118, 120, e-receipt and/or customer's mobile device may be communicated from the EAS element deactivation system 104 to the computer 102 for processing and/or storage in the item database 132.

Additionally or alternatively, the EAS element deactivation system 104 may prompt the user via a touch screen display 116 or other input means (e.g., a display and keypad) to enter customer authentication information (e.g., a user name, a password, and/or biometric data) which can be used to authenticate the customer. Such customer authentication information may also be obtained from the customer via user inputs of the customer's mobile device, instead of user inputs of the EAS element deactivation system 104. The customer authentication information data may then be sent from the EAS element deactivation system 104 to the computer 102 for processing and/or storage in the item database 132. If the user is authenticated by the computer 102, then the computer 102 may send a message to the EAS element deactivation system 104 indicating that the customer has been authenticated and has permission to deactivate EAS elements of one or more items. The manner in which such permission is determined will be described in detail below. Still, it should be understood that such permission may be determined based on the data obtained from the price tag 118, 120, e-receipt and/or customer's mobile device.

The item 120 may be purchased by the customer using a POS device 128. During operation, the POS device 128 communicates with the computer 102 and the EAS element deactivation system 104 via the communication network 106 so as to tender a purchase transaction. POS device 128 may include, but is not limited to, a self-checkout POS device with an input device 130. The self-checkout POS device may be a fixed self-checkout POS device or a mobile self-checkout POS device (e.g., such as a wireless mobile device running a retailer application). The POS device 128 may be owned by the retail store, leased by the retail store from another party, and/or owned by a customer. In all scenarios, the POS device 128 may include, but is not limited to, a mobile communications device, a smart phone, a tablet and/or a personal digital assistant running a retailer software application. The retailer software application may be configured to facilitate the scanning of the price tag 118 to obtain data therefrom and/or the communication of data to and from item database 132 and/or computer 102. The retailer software application may also facilitate user-software interactions for entering payment details and the tendering of the purchase transaction for one or more items 120. In this regard, the retailer software application may communicate with a retailer's backend software. The backend software of the retailer may confirm that the purchase transaction is complete, and thereafter issue a signal to the EAS element deactivator 104 indicating the completion of the purchase transaction.

Communication network 106 may include a cellular communication network, a Public Switched Telephone Network ("PSTN"), an Internet Protocol ("IP") network, a Wide Area Network ("WAN") and/or a Local Area Network ("LAN") (such as an Ethernet LAN). Communication network 106 may be a wireless network, such as Wi-Fi, satellite, infrared, Bluetooth, Ultra Wide Band ("UWB"), Zigbee, Wireless Personal Area Network ("WPAN"), or other communication network. Computer 106 and EAS element deactivation system 104 may be connected via the communication network 106 to other computers, such as computers associated with a merchandise supplier, a computer storing item database 132, or any other third party (not shown) located on the retail store premises or at some other location accessible through the Internet or World-Wide-Web.

Price tag 118 and EAS element 134 may be associated with item 120, such as by being affixed or removeably affixed to item 120. EAS element 134 may be a standalone or integrated into hardware such as an electronic price tag 118, i.e., EAS element 134 may be integrated as part of the price tag 118. EAS element 134 is usually fixed to merchandise or books, such as item 120. EAS element 134 is removed or deactivated by the store sales associate when item 120 is properly bought or checked out. At the exits of the retail store, a detection system sounds an alarm or otherwise alerts a retail associated when the detection system senses an active EAS element 134 that has not been properly deactivated.

EAS element 134 may be an acousto-magnetic element made of a strip of metal. Detection of EAS element 134 is achieved by sensing harmonics and signals generated by the magnetic response of EAS element 134 when exposed to a magnetic field. EAS element 134 may be demagnetized so it may no longer produce harmonic signals. In radio-frequency systems, EAS element 134 may include a circuit with a capacitor and an inductor. The circuit may have a resonance peak. To deactivate EAS element 134, EAS element 134 may be exposed to a strong electromagnetic field that induces a voltage exceeding the capacitor's voltage, hence destroying the capacitor. EAS element 134 may be imprinted with a code, such as a barcode.

Price tag 118 may also be associated with objects and/or fixture(s) in the retail store, such as a shelf or display. Price tag 118 may be a price tag, including a Radio Frequency Identifier ("RFID") tag configured to transmit an RFID signal in response to a received RFID interrogation signal, among other types of tags. Price tag 118 may include a transmitter, such as a Near Field Communication ("NFC") transmitter, a receiver (such as an NFC receiver) and a memory for storing tag data 122. Alternatively, tag data 122 may be printed on the price tag. 118

Tag data 122 may include optically readable data such as a Stock-Keeping Unit ("SKU"), a Quick Response ("QR") code, a Universal Product Code ("UPC") and other optically readable codes. For instance, tag data 122 may include an optical 1-dimensional or 2-dimensional barcode that can be scanned by scanner 110 and input device 130, which may be, for example, a barcode scanning application or a barcode scanning device (e.g., an optical scanner). Tag data 122 may include numbers, letters, symbols, a combination of these, or any other types of code.

Price tag 118 may be configurable and/or programmable. In particular, price tag 118 may be programmed wirelessly by computer 102 using wireless sensor protocols or using other tag programming methods known in the art. Since price tag 118 may receive and transmit signals, in-store communication network 106 may communicate with price tag 118 to update tag data 122.

Figure 4:
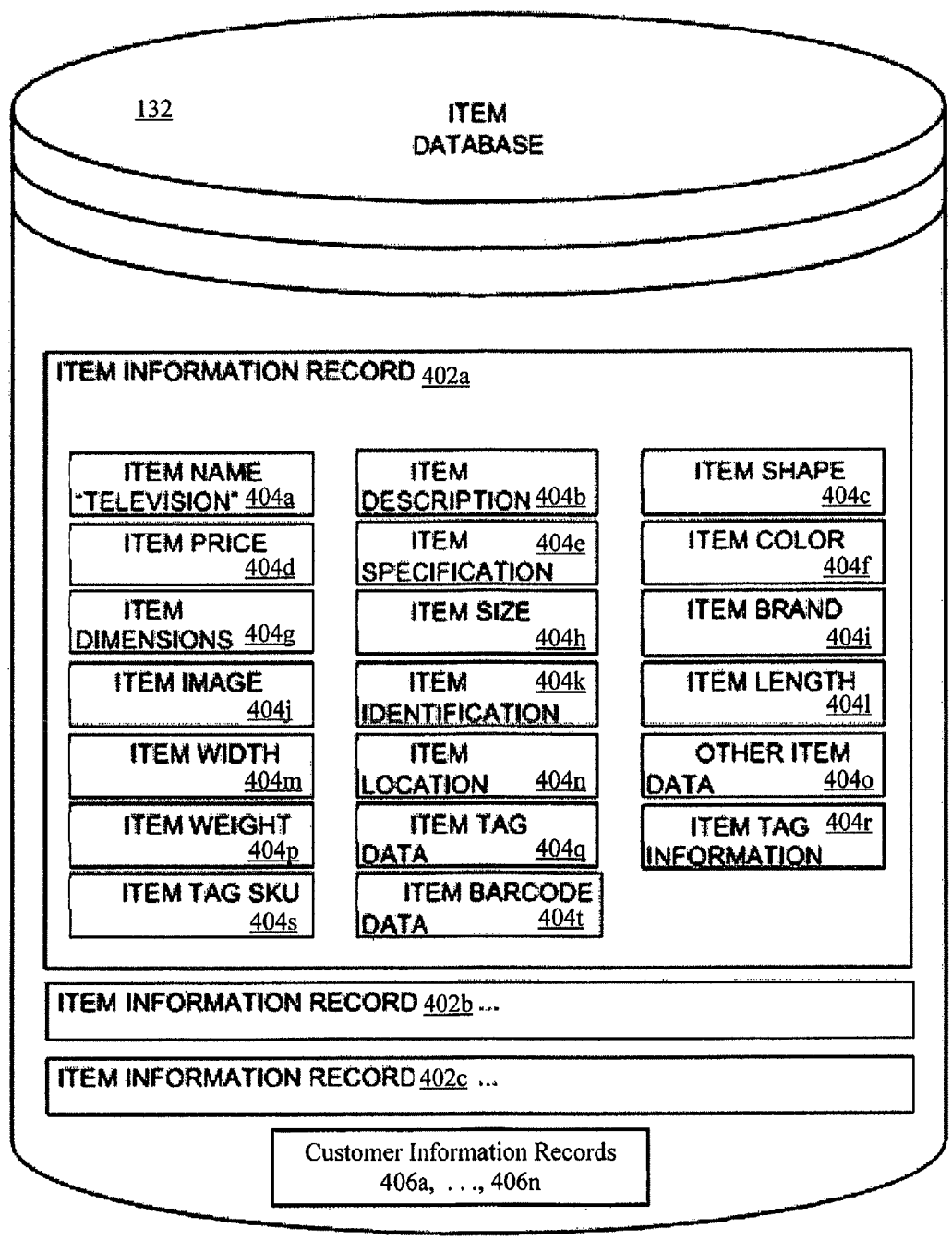
FIG. 4 is a block diagram of an exemplary item database that is useful for understanding the present invention.

Tag data 122 may include any data associated with item 120. For example, tag data 122 may include data stored in item database 132. A more detailed schematic illustration of item database 132 is provided in FIG. 4. As shown in FIG. 4, various data can be stored in item database 132 as one or more item information record 402. Each item information record 402 can include, but is not limited to, data specifying an item name 404a, an item description 404b, an item shape 404c, an item price 404d, item specifications 404e, an item color 404f, item dimensions 404g, an item size 404h, an item brand 404i, an item identification 404k, an item weight 404p, item tag information 404r, and an item tag SKU 404s. Additionally or alternatively, the item information records 402 may include item tag data 404q, item barcode data 404t (such as item barcode data from barcode 124), and/or other item data 404o.

In some scenarios, a purchased item is validated using computer 102. For example, computer 102 may use the size, shape, dimension or image of the item to match the scanned price and product description of the item. Price tag 118 may include the price, which may be scanned using POS device 128. Additionally, price tag 118 may include data that includes the product description of an item, or data that can be used by computer 102 to obtain the product description of an item. Additionally or alternatively, computer 102 may validate a purchased item using a photo image. EAS element deactivation system 104 may be equipped with low-cost video camera 108. Customer 126 may present the item for deactivation. In turn, camera 108 captures an image of the item. The image may be matched in a store inventory database. Computer 102 makes a determination as to whether the item corresponds to the image in the database, and to the purchased item 142 in purchase receipt 140.

In accordance with another aspect, a method for activating an EAS element deactivator 114 includes receiving the weight of an item from scale 112. The item is associated with an item weight stored in computer 102 (the item weight may be stored in a database). The weight of the item received from scale 112 is compared with the item weight stored in computer 102. Computer 102 makes a determination, based at least on the comparison of the weight with the item product identification or tag data 122, as to whether the weight corresponds to the item presented for deactivation. If, based at least on an analysis of tag data 122 and the weight of the item, it is determined that price tag 118 corresponds to the item presented for deactivation, then EAS element deactivator 114 is activated for use. Scale 112 may be a solenoid type weight scale.

A retailer's building may be equipped with video surveillance devices, such as video cameras. A video camera identifies an item being pulled from a shelf at a retail store by customer 126, based at least on the location of the item in the retail store and the shelf. Computer 102 may store a database that may be used to recognize products based on the location of the product. As customer 126 (e.g., a shopper) scans price tag 118 corresponding to an item, the price and image of the item are validated.

Customer 126 may use self-checkout POS device 128 to pay for an item. Customer 126 may use input device 130 (e.g., a scanner) to scan price tag 118 associated with item 120 (e.g., a television). Customer 126 may enter payment information using POS device 128. POS device 128 may receive tag data 122 and payment information. Tag data 122 and the payment information may be transmitted by POS device 128 to computer 102. In response to receiving tag data 122 and the payment information, computer 102 may send to POS device 128 a confirmation that the item has been purchased. Payment confirmation may include purchase receipt 140, which may be a paper receipt or an e-receipt. The e-receipt may be displayed on a display screen of the POS device 128. Purchase receipt 140 includes a list of identifiers identifying one or more purchased items 142. In this example, purchased item 142 is item 120 since item 120 has the correct price tag 118. However, if item 120 has an incorrect price tag (e.g., a tag corresponding to a baseball), purchased item 142 will not be item 120, but another item (e.g., the baseball).

Customer 126 approaches EAS element deactivation system 104 in order to deactivate EAS element 134 associated with item 120. When customer 126 presents item 120 including EAS element 134 for deactivation, camera 108 captures image 144 of item 120. To determine whether purchased item 142 is item 120, EAS element deactivation system 104 sends image 144 for analysis to computer 102. Computer 102 analyzes image 144 using visual recognition techniques to determine whether image 144 corresponds to purchased item 142 in purchase receipt 140. Computer 102 examines purchase receipt 140, which includes tag data 122, to ascertain whether purchase receipt 140 indicates that the purchased item 142 is item 120 in image 144. As such, computer 102 verifies that item 120 shown in image 144 matches purchased item 142 in purchase receipt 140.

If computer 102 determines that image 144 corresponds to purchased item 142 shown in purchase receipt 142, then computer 102 activates EAS element deactivator 114. Customer 126 may then use EAS element deactivator 114 to deactivate EAS element 134. Else, if computer 102 determines that image 144 does not correspond to purchased item 142 in purchase receipt 140, then computer 102 may send a message using communication network 106 to a store sales associate. The message may indicate that a customer tried to deactivate security EAS element 134 associated with item 120, but item 120 does not match or correspond to purchased item 142 identified in the purchase receipt 140.

Figure 2:
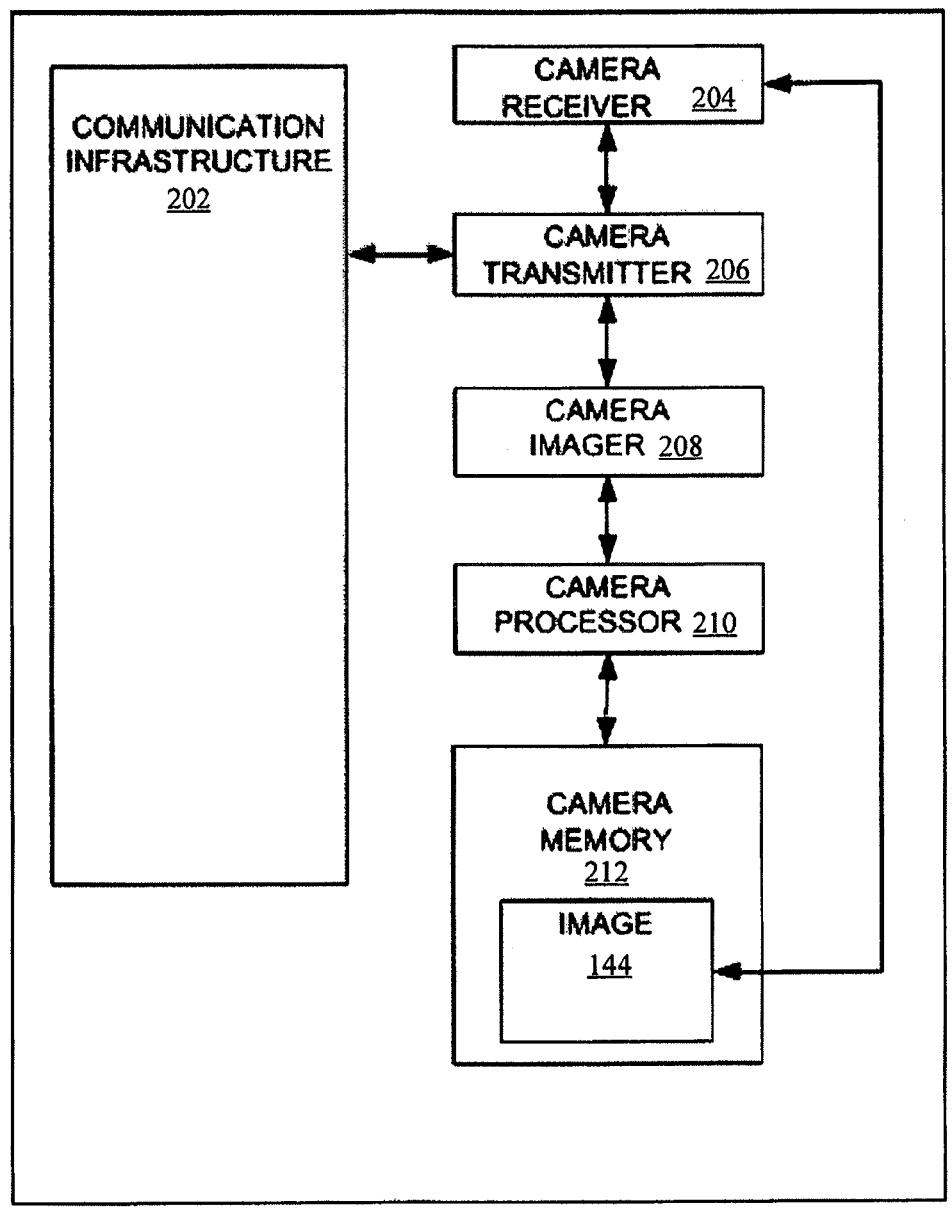
FIG. 2 is a block diagram of an exemplary camera that is useful for understanding the present invention.

FIG. 2 is a block diagram of an exemplary architecture for camera 108 of FIG. 1. Camera 108 of EAS element deactivation system 104 may be a low cost video camera configured to capture the shape, size, dimensions and any other physical characteristics of item 120. Camera 108 may include camera receiver 204, camera transmitter 206, camera processor 210, camera imager 208 and camera memory 212. The listed components 204-212 can communicate with each other directly. Also, camera transmitter 206 is in communication with the communication infrastructure 202. It is understood that the interconnection of components is not limited to the arrangement shown in FIG. 2. For example more than one of the components can be interconnected to and communicate via communication infrastructure 202. Camera imager 208 is configured to capture image 144 of item 120. Camera receiver 204 is configured to receive image 120. Image 120 is stored in camera memory 212. Camera transmitter 206 is configured to transmit image 120 to computer 102 for visual image analysis.

Figure 3:
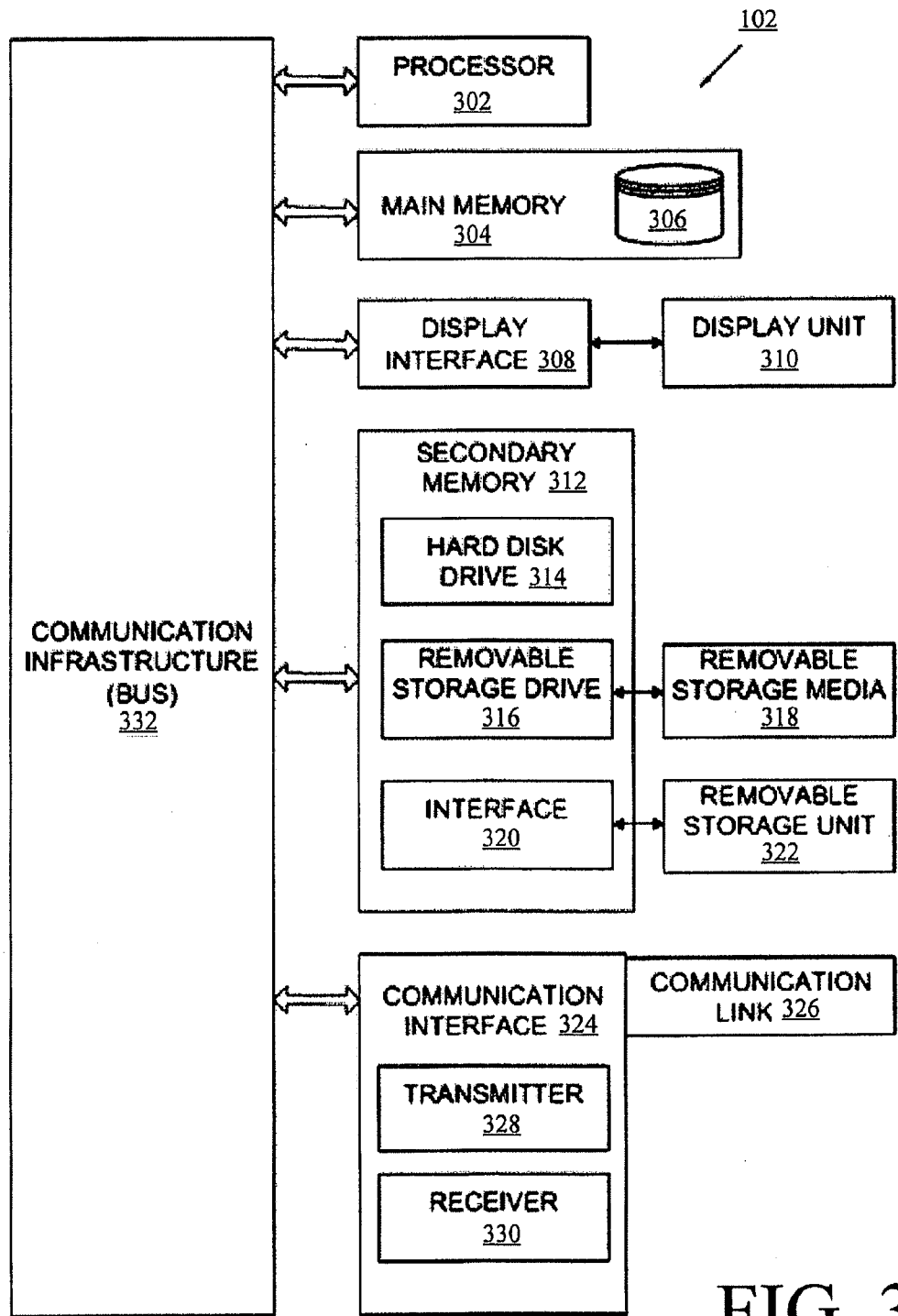
FIG. 3 is a block diagram of an exemplary computer that is useful for understanding the present invention.

FIG. 3 is a block diagram of an exemplary architecture for computer 102 of FIG. 1. Computer 102 may be located at the retail store or a remote location. Computer 102 includes one or more processors 302 programmed to perform the functions described herein. Processor 302 is operatively coupled to a communication infrastructure 332. The communication infrastructure 332 can include, but is not limited to, a communications bus, a cross-bar interconnect, and/or a network. Processor 302 may execute computer programs stored on disk storage for execution via secondary memory 312. Processor 302 may be configured to perform image analysis to extract meaningful information from an image (e.g., an image 144 or photograph of item 120). Processor 302 may analyze the image using image processing techniques. For example, processor 302 may identify item 120 in image 144 using techniques such as pattern recognition, digital geometry, 2D/3D object recognition, image segmentation, motion detection, particle tracking, video tracking, optical flow, signal processing, and/or other image recognition techniques.

Additionally, processor 302 may extract quantitative information from image 144 using geometry. Processor 302 may process image 144 to extract image data including physical features of item 120. Image data extracted may be used to identify, describe, interpret and evaluate image 144. Processor 302 may analyze image 144 to obtain useful information and image data from image 144. Processor 302 may be configured to recognize shapes in image 144 and use algorithms to measure, for example, the size of the shapes, determine the morphology of the shapes and the general structure of item 120. Processor 302 may also determine physical characteristics of image 144 (e.g., such as a length, height, width, color, size, shape, texture, and/or dimensions) of item 120. Image data obtained from image 144 may be exported and stored in item database 132. Likewise, image 144 may be stored in item database 132.

Computer 102 may optionally include or share a display interface 308 that forwards graphics, text, and other data from the communication infrastructure 332 (or from a frame buffer not shown) for display on display unit 310. Display unit 310 may be a Cathode Ray Tube ("CRT") display, a Liquid Crystal Display ("LCD"), a plasma display, a Light-Emitting Diode ("LED") display or touch screen display, among other types of displays.

Computer 102 also includes a main memory 304 and a secondary memory 312. Main memory 304 can include, but is not limited to, a Random Access Memory ("RAM") and/or a Read Only Memory ("ROM"). Secondary memory 312 may include, but is not limited to, a hard disk drive 314 and/or a removable storage drive 316 (e.g., a removable hard disk drive, a magnetic tape drive, and/or an optical disk drive). The removable storage drive 316 reads from and/or writes to a removable storage media 318 in a manner well known to those having ordinary skill in the art. Removable storage media 318 may include, but is not limited to, the following computer usable storage medium(s): a floppy disk; an external hard disk; a magnetic tape; and/or an optical disk. The removable storage media 318 has computer software and/or data stored thereon.

In alternative embodiments, secondary memory 312 may include other similar devices for allowing computer programs or other instructions to be loaded into the computer system and for storing data. Such devices may include, for example, a removable storage unit 322 and an interface 320. Examples of such may include a program cartridge and cartridge interface (such as that found in video game devices), flash memory, a removable memory chip (such as an EPROM, EEPROM or PROM) and associated socket, and other removable storage units 322 and interfaces 320 which allow software and data to be transferred from the removable storage unit 322 to other devices.

Computer 102 may also include a communications interface 324. Communications interface 324 allows software and data to be transferred to external devices. Examples of communications interface 324 may include, but are not limited to, a modem, a network interface (such as an Ethernet card), a communications port, a PCMCIA slot and card, and/or a wireless transceiver/antenna. Communication interface 324 may include a transmitter 328 and a receiver 330. Software and data transferred via communications interface/module 324 may be, for example, electronic, electromagnetic, optical, or other signals capable of being received by communications interface 324. These signals are provided to the communications interface 324 via the communications link (i.e., channel) 326. Communications link 326 carries signals and may be implemented using wire or cable, fiber optics, a phone line, a cellular phone link, an RF link, and/or other communications channels.

It is understood that computer 102 may have more than one set of a communication interface 324 and a communication link 326. For example, computer 102 may have a communication interface 324/communication link 326 pair to establish a communication zone for wireless communication, a second communication interface 324/communication link 326 pair for low speed (e.g., WLAN, wireless communication), a third communication interface 324/communication link 326 pair for communication with low speed wireless networks, and a fourth communication interface 324/communication link 326 pair for other communication.

Computer programs (also called computer control logic) are stored in main memory 304 and/or secondary memory 312. For example, computer programs are stored on secondary memory 312 (e.g., a disk storage) for execution by processor 302 via main memory 304 (e.g., a RAM). Computer programs may also be received via communications interface 324. Such computer programs, when executed, enable the method and system to perform the features of the present invention as discussed herein. In particular, the computer programs, when executed, enable processor 302 to perform the features of the corresponding method and system. Accordingly, such computer programs represent controllers of the corresponding device.

Although a single computer 102 is mentioned, the present invention is not limited to such. It is contemplated that more than one computer 102 can be implemented. Therefore, computer 102 functionality may be performed by a single computer or distributed among multiple computers or computing devices. For example, computer 102 functionality may be performed by an in-store or off-site computer 102. Alternatively, computer 102 functionality may be performed by several computing devices that may be located in the same general location or different locations (e.g., via cloud computing). In other words, each computing device may perform one or more particular sub-processes of computer 102. As such, computer 102 may be a system of components that functions collectively to receive, process and analyze image 144.

Various software embodiments are described in terms of this exemplary computer system. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device. For example, configuration and management of computer 102 may be designed to occur remotely by web browser. In such case, the inclusion of display interface 308 and display unit 310 may not be required. Even though computer 102 is described herein as comprising hardware devices, computer 102 may be implemented in software executed in a cloud server infrastructure.

Computer 102 may include or may be in communication with item database 132. Item database 132 may be stored in main memory 304, an external storage device, or in another computer in communication with computer 102 (not shown). Item database 132 may include data that is relevant to the determination of whether item data (such as a weight or image 144) corresponds to the purchased item 142. Of note, although item data is described as being stored in a database, the invention is not limited to such, and other data structures may be used to store data. For example, data may be stored in a text file or a hash table.

FIG. 4 is a block diagram of an exemplary item database 132. Item database 132 may be a corporate or store inventory database that stores information on items for sale and/or checkout therefrom. Item database 132 may include multiple item information records 402a, . . . , 402c. Each item information record 402a, . . . , 402c corresponds to an item for sale. For example, item information record 402a stores information related to a first item 120. Item information record 402b stores information about a second item. Item information record 402c stores information about a third item. Although only three item information records 402a, . . . , 402c are shown in FIG. 4, the invention is not limited to such. Item database 132 may store any number of item information records. Further, even though FIG. 4 only shows exemplary item information record 402a in expanded form, each item information record 402a, . . . , 402c stored in item database 132 may include the same or similar information stored in item information record 402a.

Item information record 402a may store any type of information related to item 120. For example, item information record 402a may include, but not be limited to an item name 404a, item description 404b, item shape 404c, item price 404d, item specifications 404e, item color 404f, item dimensions 404g, item size 404h, item brand 404i, item image 404j, item identification 404k, item length 404l, item width 404m, item location 404n, other item data 404o, item weight 404p, item tag data 404q, item tag information 404r, item tag SKU 404s and item barcode data 404t. Item information record 402a may also store images (e.g., image 120) of items available for sale and/or checkout, measurements of items 120, a size of a packing box associated with the items 120, and/or other item related data. Additionally, item database 132 may include an item model and other item physical characteristics. Item database 132 may be associated with a vendor and may be stored in a vendor computer that communicates with computer 102 via communication network 106.

Figure 5:
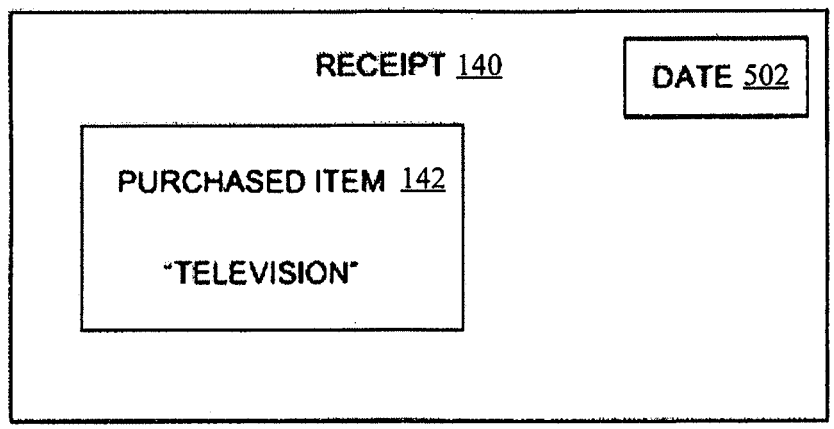
FIG. 5 is a block diagram of an exemplary purchase receipt that is useful for understanding the present invention.

FIG. 5 is a block diagram of an exemplary purchase receipt 140. Purchase receipt 140 may include, but is not limited to, an e-receipt transmitted by computer 102 to POS device 128. Purchase receipt 140 may include purchased item 142 and date of purchase 94. Purchased item 142 may include any data corresponding to a purchased item, including but not limited to, tag data 122, item name 404a, item description 404b, item identification 404k, item tag data 404q, item tag information 404r, item tag SKU 404s and/or item barcode data 404t. For example, purchase receipt 140 in FIG. 5 may include "TELEVISION" as purchased item 142.

In an exemplary embodiment, a retailer may wish to control the use of EAS elements deactivation tools (e.g., EAS element deactivation system 104 of FIG. 1) to prevent the unauthorized use thereof to deactivate an EAS element (e.g., EAS element 134 of FIG. 1). A customer (e.g., customer 126 of FIG. 1) may pay for an item (e.g., item 120 of FIG. 1) using mobile or fixed POS device (e.g., POS device 128 of FIG. 1). The customer may scan a price tag (e.g., price tag 118 of FIG. 1) associated with the item using the self-checkout POS device. In turn, the POS device receives the tag data 122, which may include a purchase price. Thereafter, the POS device transmits the tag data to a computer (e.g., computer 102 of FIG. 1) for processing and/or storage in a database (e.g., database 132 of FIG. 1).

The customer may choose to pay for the item using any purchasing means (e.g., a credit card). POS device 128 receives and transmits payment information to computer 102. In response, computer 102 may verify tag data 122 and payment information. Computer 102 may send purchase receipt 140 to POS device 128 as a proof of purchase. Purchased item 142 may be identified in purchase receipt 140. Once the customer has paid for the item, the customer approaches the EAS element deactivation system 104 to deactivate the EAS element 134 associated with the item 120.

EAS element deactivation system 104 is used to validate item 120 before deactivating EAS element 134 associated with item 120. EAS element deactivation system 104 ensures that item 120 has been paid for prior to activating EAS element deactivator 114 to allow deactivation of EAS element 134 by obtaining item data including a physical attribute of purchased item 142. Item data may include an image 144 of item 120 and a weight of item 120, among others.

In an exemplary embodiment, item data includes image 144 of item 120. Camera 108 captures image 144 and transfers the image to computer 102 for visual analysis. Computer 102 receives the item data and analyzes image 144 to determine which item is shown therein. Computer 102 may also determine image data from the image 144, such as physical characteristics of the item shown in the image. The physical characteristics may include, but are not limited to, a length, a height, a width, a color, a size, a shape, a texture, and/or geometric dimensions. Further, computer 102 may analyze image data to determine which item is shown therein.

The item data (e.g., image 144 and/or image data obtained therefrom) may correspond to an item associated with an item information record 402a, . . . , 402c in item database 132. Computer 102 may use visual analysis to match item information stored in item database 132 to the item shown in the image 144. By way of example, computer 102 may determine that the item matching image 144 is item 120 (e.g., a television) associated with the item information record 402a.

As such, computer 102 examines purchase receipt 140 to determine whether purchased item 142 is a television. If purchased item 142 matches the determined item 120, computer 102 sends an activation signal to EAS element deactivator 114. Customer 126 may then use EAS element deactivator 114 to deactivate EAS element 134. Else, computer 102 may send a message to a store sales associate indicating that purchased item 142 does not match the item in image 120, as purchase receipt 140 does not show that customer 126 paid for item 120 in image 144.

Exemplary Methods for Activating EAS Element Deactivator

Figure 6:
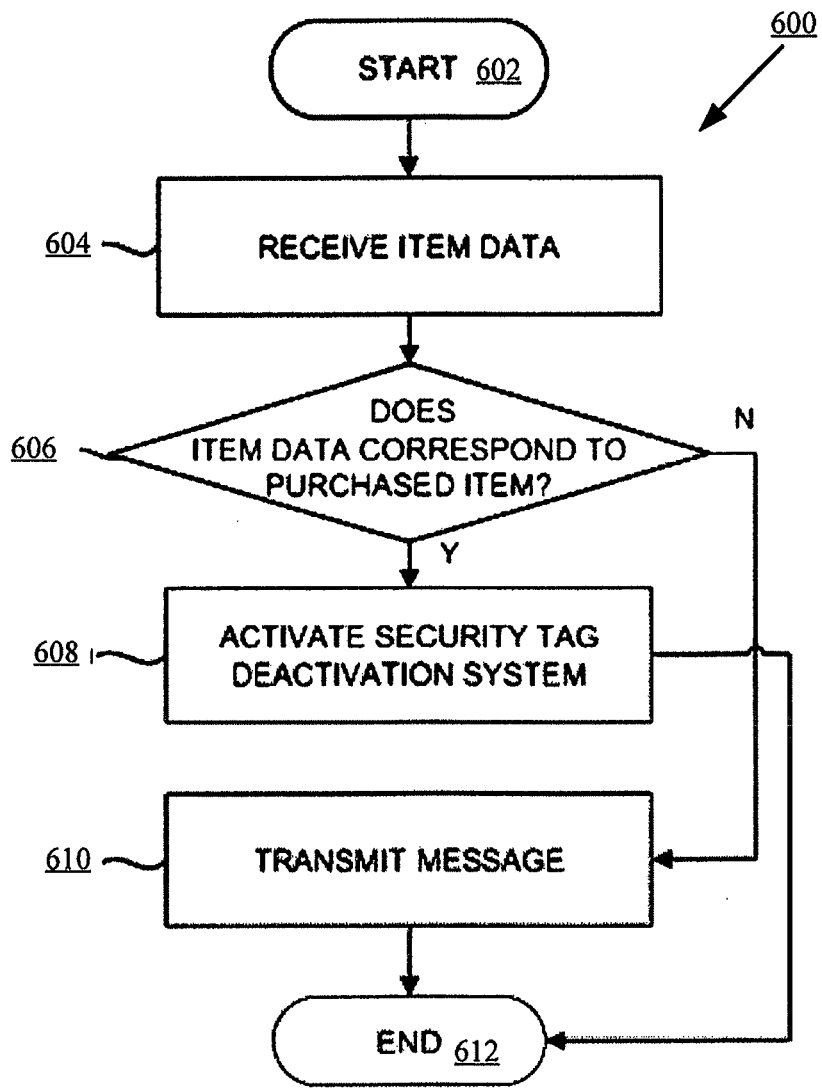
FIG. 6 is a flow chart of an exemplary process for activating an EAS element deactivator using item data that is useful for understanding the present invention.

Referring now to FIG. 6, there is provided a flowchart of an exemplary method 600 for activating EAS element deactivator 114 using item data (e.g., item data 404a, . . . , 404r). Method 600 begins with step 602, and continues with step 604 where item data is received. The item data may include an image (e.g., image 144 of FIG. 1) of an item (e.g., item 120 of FIG. 1). In a next step 606, a determination is made as to whether an item identified by the item data matches a purchased item (e.g., purchased item 142 of FIGS. 1 and 5) identified in a purchase receipt (e.g., purchase receipt 140 of FIGS. 1 and 5). If the item identified by the item data matches the purchased item [606:YES], then EAS element deactivator is activated, as shown by step 608. Else [606:NO], a message stating that the purchased item does not match the item identified by the item data is transmitted to at least a store employee or security personnel, as shown by step 610. Subsequently, step 612 is performed where method 600 ends or other processing is performed.

The present invention is not limited to the particular of method 600. Additionally or alternatively, method 600 can involve making a determination as to whether the item corresponding to the item data matches an item specified by data stored in an item database (e.g., item database 132 of FIG. 1). In this case, a computer (e.g., computer 102 of FIG. 1) may query the item database using item data and/or image data. For example, an item information record (e.g., record 404a of FIG. 4) corresponding to an item (e.g., item 120 of FIG. 1) may include an item image 404j. The item image 404j may be an image of the item (e.g., a television). As such, the item image 404j is an image of the same item that is shown in the image of the image data.

Using visual analysis, computer 102 may determine that the item identified in the image matches the item identified in the item image 404j. Since the item image 404j corresponds to item information record 404a of item 120 (e.g., a television), computer 102 proceeds to determine whether the purchased item 140 is of the same type as item 120 (e.g., a television). If computer 102 determines that purchased item 142 in purchase receipt 140 is item 120, then computer 102 activates EAS element deactivator 114.

The computer 102 may additionally or alternatively use visual analysis to determine the size, measurements, length, width, and/or color of the item identified in the image. For example, computer 102 may determine that the determined size of the item shown in the image matches item size 404h and/or that the determined dimensions of the item match item dimensions 404g. Since the size and dimensions determined match item size 404h and item dimensions 404g corresponding to item information record 402a associated with item 120, computer 102 determines that the item in image 144 is item 120.

In some cases, the item data may match any item information record stored in item database 132. For example, computer 102 may compare item data with any information in item information record 402a. If computer 102 determines that the item data matches information in item information record 402a of item 120, computer 102 may use information in item information record 402a to compare with purchased item 142. The comparison allows computer 102 to determine whether purchase receipt 140 shows that the determined item has been paid for.

For instance, computer 102 may compare item name 404a (or any information in item information record 402a) with the purchased item 142 information contained in the purchase receipt 140. Computer 102 may examine the purchase receipt 140 to determine whether purchased item 142 is the same as the item determined to match image 144. Purchased item 142 may include the name of the item (such as item name 404a). Computer 102 may compare item name 404a in item information record 402a with item name 404a in purchased item 142. If the determined item name (e.g., item name 404a) matches the name of the purchased item 140, then computer 102 sends an activation signal to the EAS element deactivation system 104 to activate EAS element deactivator 114.

Purchased item 142 identified in purchase receipt 140 may match or correspond to any information in item information record 402a, including but not limited to item name 404a, item description 404b, item shape 404c, item price 404d, item specifications 404e, item color 404f, item dimensions 404g, item size 404h, item brand 404i, item image 404j, item identification 404k, item length 404l, item width 404m, item location 404n, other item data 404o, item weight 404p, item tag data 404q, item tag information 404r, item tag SKU 404s and item barcode data 404t.

For example, purchased item 142 identified in purchase receipt 140 may include an item identification, such as item identification 404k. Computer 102 may determine that item data corresponds to item 120 associated with item information record 402a. Computer 102 verifies that purchase receipt 140 indicates that customer paid for the item in the image. Computer 102 may compare the item identification 404k in purchased receipt 140 with item identification 404k of item information record 402a, as purchased item 142 includes item identification 404k. If computer 102 determines that purchased item 142 matches item identification 404k corresponding to item 120, then computer 102 sends an activation signal to EAS element deactivator 114.

On the other hand, computer 102 may determine that purchased item 142 does not match the item data. If computer 102 determines that purchased item 142 does not match image 144, computer 102 denies the deactivation of EAS element 134. Computer 102 may also transmit a message for display on display 116 of EAS element deactivation system 104. The message may advise customer that a store sales associate is on his/her way to assist with the transaction. Computer 102 may also transmit an assistance request message to the store sales associate. The message may inform the store sales associate that there is a discrepancy between purchased item 142 and the item data, and that the store sales associate should assist customer with the deactivation of EAS element 134.

Figure 7:
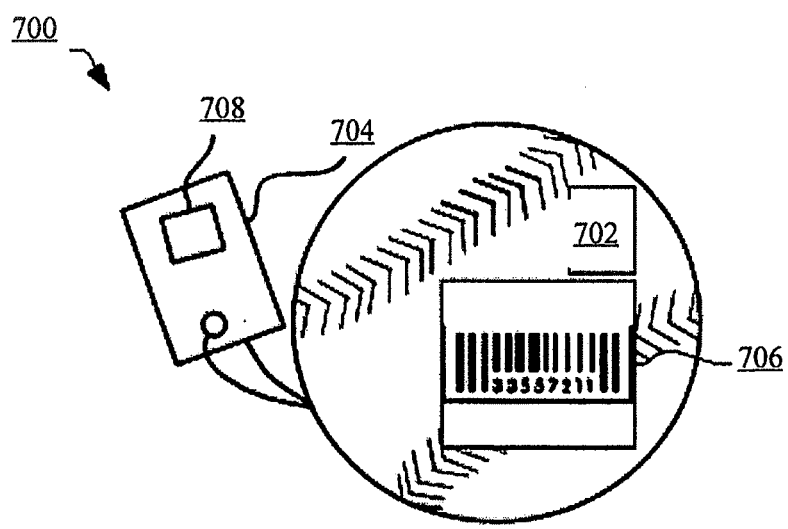
FIG. 7 illustrates an exemplary item that is useful for understanding the present invention.

Referring now to FIG. 7, there is provided a schematic illustration of exemplary article which may constitute an item 700 associated with an EAS element 702, price tag 704 and a manufacturer barcode 706. The price tag 704 may include tag data 708. In some scenarios, a customer may switch the price tag 118 of item 120 with the price tag 704 of another item 700. For example, customer may wish to buy item 120 (e.g., a high definition flat screen television) which has a relatively high price (e.g., $1,000.00). The customer decides that item 120 is too expensive. As such, the customer finds anther item 700 (e.g., a baseball) with a relatively low price (e.g., $10.00). The tag data 708 may include the price of item 700, which is less than the price of item 120. Customer then switches price tag 118 with price tag 704. After switching price tag 118 with price tag 704, the customer may pay using a self-checkout station (e.g., POS device 128 of FIG. 1). In this regard, the self-checkout station is used to scan the price tag data 708. In effect, the customer pays the amount indicated by price tag data 708, instead of paying the full price of the item 120. A purchase receipt 140 is then generated including information identifying the purchased item 142. The purchase receipt 140 indicates that item 700 was purchased, rather than item 120. Purchase receipt 140 may further indicate that the customer paid the relatively low price for the purchased item (e.g., $10.00).

Upon completing the purchase transaction, the customer may then approach the EAS element deactivation system 104 with the item 120, and try to deactivate the EAS element 134 attached to item 120. A camera 108 of the EAS element deactivation system 104 may take a picture/image 144 of item 120, and transmit the image 144 to the computer 102 for visual analysis. In response to the reception of the image 144, the computer 102 processes the image 144 to determine the type of item shown in the image 144 (e.g., a television). Next, the computer 102 determines whether the purchase receipt 140 shows that the customer paid for the item shown in the image 144. If it is determined that the purchase receipt 140 indicated that the customer paid for an item other than the item shown in the image 144, then the computer 102 denies the activation of EAS element deactivator 114. Also, the computer 102 may send a message to a store sales associate stating that the purchased item identified on the purchase receipt 140 does not match the item shown in the image 144.

Additionally or alternatively, the computer 102 may perform visual analysis on the image 144 to determine image data including physical attributes of the item depicted therein. For example, computer 102 may determine that the image 144 shows item 120, which is a large squared item. Further, computer 102 examines the purchase receipt 140 for a matching item (e.g., an item that is a large squared item). To do so, the computer 102 may look up in item database 132 for an item record information corresponding to the purchased item 142 (e.g., the baseball). Once computer 102 finds the item information record corresponding to the purchased item, the computer 102 may analyze the item information record to determine the size and/or shape of the item identified in the purchase receipt 140 (e.g., the item is a small round item). Next, the computer 102 may compare the "large squared item" description of item 120 with the "small round item" description in the item information record corresponding to item (e.g., item 700) identified in the purchase receipt 140. Since the item descriptions do not match, the computer 102 determines that item (e.g., item 700) identified in the purchase receipt 140 does not match the item shown in the image 144. As such, the computer 102 determines that the item shown in the image 144 has not been paid for. Since the computer 102 determines that there is a discrepancy between the item shown in the image 144 and the item (e.g., item 700) identified in the purchase receipt 140, the computer 102 does not activate EAS element deactivator 114. Instead, the computer 102 sends a message (e.g., an assistance request message or an alert message) informing a store sales associate that a customer is attempting to deactivate an item that was not paid for. The message may also state that the purchase receipt 140 indicates that the customer paid for an item (e.g., item 700) that is different than that portrayed in the image 144.

Figure 8:
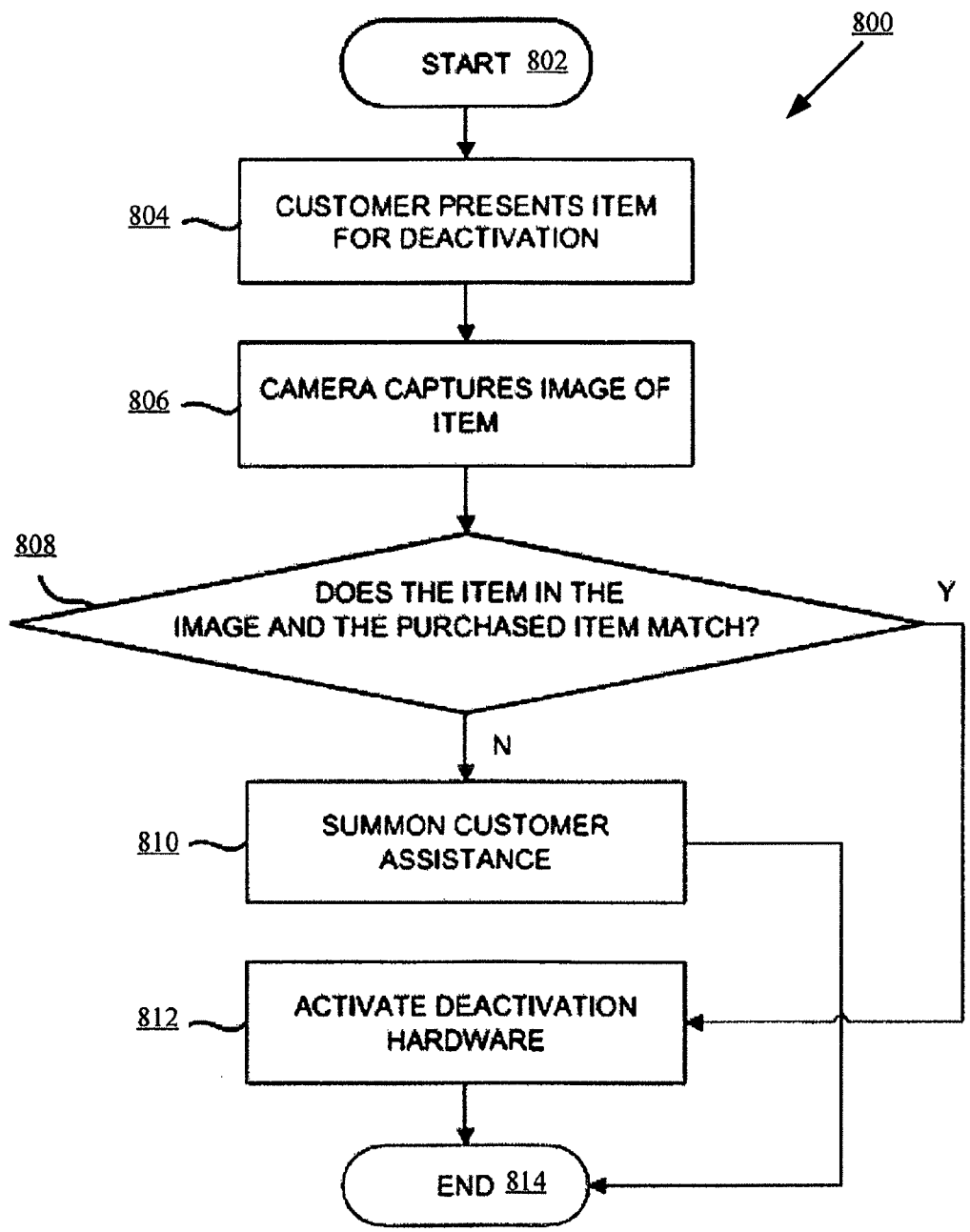
FIG. 8 is a flow chart of another exemplary process for activating an EAS element deactivator using an image of an item that is useful for understanding the present invention.

FIG. 8 is a flowchart of another exemplary method 800 for determining whether to activate EAS element deactivator 114 based on an analysis of an image 144. Method 800 begins with step 802 and continues with step 804. In step 804, a customer (e.g., customer 126 of FIG. 1) presents an item (e.g., item 120 of FIG. 1) for deactivation of the EAS element (e.g., EAS element 124 of FIG. 1) at an EAS element deactivation system (e.g., system 104 of FIG. 1). Next in step 806, a camera (e.g., camera 108 of FIG. 1) captures the image of the item. The image is used by a computer (e.g., computer 102 of FIG. 1) in decision step 808. Decision step 808 involves: querying an item database (e.g., item database 132 of FIG. 1) to determine which item is depicted in the image; and determining whether the item shown in the image matches the item identified in the purchase receipt (e.g., purchase receipt 140 of FIG. 1). If the item shown in the image matches the item identified in the purchase receipt [808:YES], then the EAS element deactivator (e.g., EAS element deactivator 114 of FIG. 1) is activated in step 812. Else [808:NO], a message is transmitted to summon customer assistance in step 810. Thereafter, step 814 is performed where method 800 ends or other processing is performed.

In some scenarios, computer 102 may initiate a second level security process when the item shown in the image does not match the item identified in the purchase receipt. For instance, when a customer brings an item to an EAS element deactivation system for deactivation of its EAS element and the computer denies such deactivation, the computer may send a message to be displayed on a display of the EAS element deactivation system. The message may request that the customer scan a barcode (e.g., barcode 124 of FIG. 1) and a price tag (e.g., price tag 118 of FIG. 1) affixed to the item presented for deactivation. In response to this request, the customer performs user-software interactions to scan the barcode and the price tag. Next, the EAS element deactivation system transmits the scan data to the computer. Upon receipt of the scan data, the computer determines whether the scan barcode data corresponds to or matches the price tag scan data. If the barcode scan data does not match the price tag scan data, then the computer may send an assistance request message to a store sales associate so that the store sales associate may resolve the inconsistency. The message may state that price tag scan data does not correspond to or match the barcode scan data.

If the barcode scan data matches the price tag scan data, then the computer may send a message indicating that, while the price tag scan data matches the barcode scan data, the computer was unable to verify whether the purchase receipt identified item 120. Further, if the computer determines that the purchased item identified in the purchase receipt does not match the item identified by the barcode scan data and/or the price tag scan data, the computer may send a message indicating that the purchase receipt does not show that the item corresponding to price tag scan data and barcode scan data has been paid for. Alternatively, the computer may be configured to activate EAS element deactivation system when either (i) the barcode scan data matches the purchased item identified in the purchase receipt and/or price tag scan data, or (ii) the price tag scan data matches the purchased item identified in the purchase receipt.

The computer may determine whether the item identified by the barcode scan data matches the purchased item identified in the purchase receipt by: comparing item identifier information contained in the barcode scan data with item identifier information contained on the purchase receipt; and/or querying an item database to determine an item information record associated with the purchased item identified in the purchase receipt. The computer may query the item database using the barcode scan data. The computer may determine that the item barcode data (e.g., data 404*t* of FIG. 4) in the item information record (e.g., record 402*t* of FIG. 4) matches the barcode scan data. As such, the computer determines that the item information record corresponds to the item associated with the barcode scan data. The computer may proceed to compare any information in item information record with information associated with the purchased item identified in the purchase receipt. For example, if the information associated with the purchased item includes an item tag SKU, the computer may compare the item tag SKU associated with the purchased item 45 with the item tag SKU contained in the item information record. If the item tag SKU associated with the purchased item matches the item tag SKU of the item information record, then the computer determines that the barcode scan data corresponds to the purchased item identified in the purchase receipt.

In some scenarios, the item data received by the computer includes a measured value for the weight of an item presented at the EAS element deactivation system 104 for deactivation of its EAS element. The measured weight value can be obtained using a scale 112 of the EAS element deactivation system 104. The scale 112 may include, but is not limited to, a solenoid type weight scale. The measured weight value may then be sent from the EAS element deactivation system 104 to the computer 102. At the computer 102, the purchase receipt 140 is analyzed so as to determine the weight of the purchased item identified therein. Next, the computer compares the measured weight value with the determined weight of the purchased item identified in the purchase receipt. If the measured weight value is the same as or approximately the same as the determined weight of the purchased item, then the computer sends an activation signal to activate EAS element deactivator. Else, if the measured weight value is not approximately equal to the determined weight of the purchased item, then the computer sends a message to a store sales associate. The message may indicate that the weight of the purchased item is not the same as the measured weight of the item presented for deactivation.

To determine the weight of the purchased item, the computer may query the item database using information obtained from the purchase receipt. The computer 102 may determine that a given item information record stored in the item database corresponds to the purchased item. The item information record may include data specifying an item weight. The item weight value contained in the item information record may then be compared to the measured weight value obtained by the scale 112. If the weight values are within a predetermined amount of each other, then the computer activates the EAS element deactivator. In contrast, if the weight values are not within a predetermined amount of each other, then the computer denies deactivation of the EAS element coupled to the item (e.g., item 120). Also, the computer may send a message to a store sales associate indicating that the weight of the item presented for EAS element deactivation does not match the weight of the purchased item.

Figure 9:
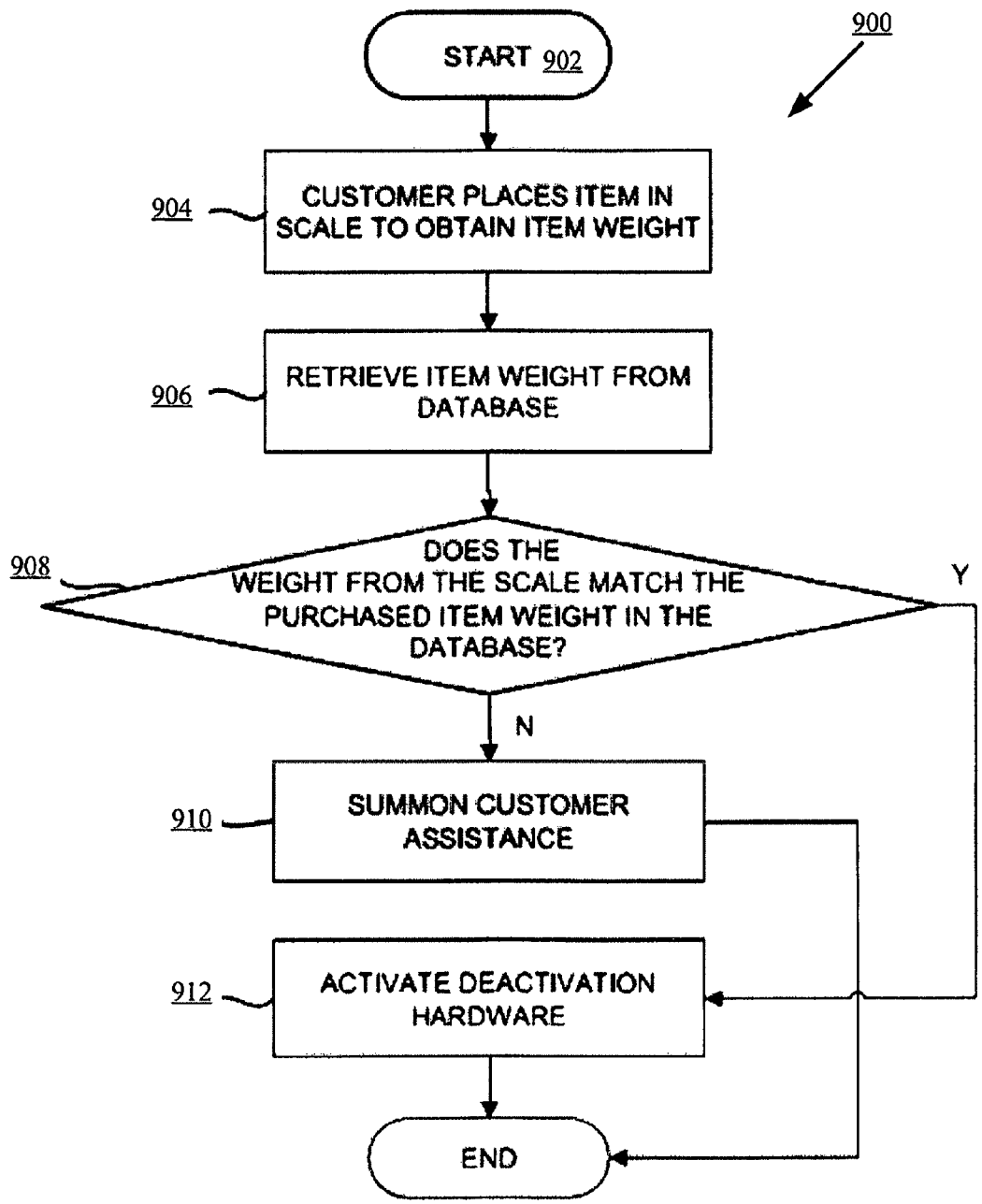
FIG. 9 is a flow chart of another exemplary process for activating an EAS element deactivator using a weight of an item that is useful for understanding the present invention.

Referring now to FIG. 9, there is provided a flowchart of another exemplary method 900 for determining whether to activate EAS element deactivator based on the weight of an item. Method 900 begins with step 902 and continues with step 904. In step 904, a customer places an item on a scale (e.g., scale 112 of FIG. 1) to obtain a weight measurement thereof. Next in step 906, the scale generates a measured weight value for the item (e.g., item 120 of FIG. 1). Subsequently, method 900 begins with a decision step 908. Decision step 908 involves: examining a purchase receipt (e.g., receipt 140 of FIG. 1) to determine what item has been purchased; querying an item database for a weight value associated with the purchased item; and determining whether the measured weight value matches the weight value associated with the purchased item. If the weight values match [908:YES], then the EAS element deactivator is activated, as shown by step 912. Else [908:NO], a message is transmitted to summon customer assistance, as shown by step 910.

In some scenarios, the computer and a scanner (e.g., scanner 110 of FIG. 1) may be used to validate that the item (e.g., item 120 of FIG. 1) matches an item identified on a price tag (e.g., price tag 118 of FIG. 1). The scanner may be used to scan a manufacturer code (e.g., code 124 of FIG. 1) associated with the item. The scanner may also be used to scan the price tag to obtain the tag data (e.g., data 122 of FIG. 1) therefrom. The EAS element deactivation system (e.g., system 104 of FIG. 1) may transmit the manufacturer code and tag data to the computer. At the computer, it is determined whether the tag data corresponds to or matches the barcode scan data. For example, the computer may determine whether a description or barcode data associated with a barcode matches tag data by comparing the barcode scan data with the tag data. If the tag data matches barcode scan data (i.e., both belong and correspond to the same item), then the computer sends an activation signal to activate the EAS element deactivator. Else, the computer may send a message indicating that tag data does not match the barcode scan data. Of note, these operations may be used as a second level security check when the item identified in the image does not match the purchased item identified in purchase receipt.

In other scenarios, cameras (such as video cameras of a store's video system) may be positioned throughout the retail store. At least one camera (e.g., camera 108 of FIG. 1) may be used to track customers through the retail store. The computer is in communication with the camera and may be configured to control the camera. The camera may also tract the items in the retail store and may take pictures/images of the items in the retail store. The pictures and images captured by the camera may be stored in an item database (i.e., may be used to update pictures and images stored in item database).

In those or other scenarios, the camera may record which item has been picked up by a customer. By way of example, a customer may pick up an item (e.g., item 120 of FIG. 1) from a shelf and may place the item in a shopper's basket or a shopping cart. The camera may take an image of the item in the shopper's basket or shopping cart. The image may be sent to the computer. At the computer, a customer may be associated with the item shown in the image. The computer may also identify the item depicted in the image by determining the location within the store where the item was picked up by the customer. The location may be identified using a planogram of the retail store (e.g., a visual diagram or drawing that provides in detail where items in a retail store are placed). A planogram may include a retail store's layout and show on which aisle and on what shelf an item is located. Additionally, the item database may include in an item information record information corresponding to the location of the item. As another example, the computer may analyze the image to determine which part of the store is shown in the image.

For example, the POS device may be a mobile POS device, such as a wireless mobile device that can be used by the customer to perform self-checkout at any location where the item is located, such as for example an aisle in the retail store. The POS device may be a handheld equipped with a mobile POS application. The POS device may be provided to the customer by the retail store or may be provided by customer. The POS device 36 may be equipped with a retailer mobile POS application. The customer may use the POS device to ring up the sale and scan the price tag. The customer may, after ringing up the sale, walk to a deactivation station or self-checkout station in order to deactivate the EAS element attached to the item. The computer may transmit an authorization to deactivate the EAS element to the EAS element deactivator. The authorization to deactivate the EAS element may include data including a characteristic of a product associated with the price in the price tag, such as the size, shape and dimensions of the product matching the scanned price in the price tag. As such, the customer may purchase the item in the aisle of the store, and does not need to go to a self-checkout station to purchase the item. The EAS element deactivation system may be a validation and deactivation station that validates the sale rang up by the customer or a sales associate using the POS device. The EAS element deactivation system may validate the transaction rang up by the customer or a sales associate by, for example, verifying/validating that the item corresponds to the received characteristics of a product associated with the price in the price tag.

For instance, to pay for the item, the customer may scan the price tag, including tag data (e.g., data 122 of FIG. 1), using an input device (e.g., input device 130 of FIG. 1) of the POS device (e.g., POS device 128 of FIG. 1). The computer may receive the tag data and determine whether the tag data matches information derived from the image associated with the customer. For example, the computer may determine whether a price associated with the price tag matches a price of the item identified in the image. As such, the item is validated during the scanning of price tag (e.g., at the time POS device processes the transaction) by determining whether the price of the item scanned corresponds to the item shown in the image.

If the price in the price tag corresponds to the price of the item shown in the image, then the computer activates the EAS element deactivator. To match the price tag with price of the item shown in the image, the computer may determine an item information record corresponding to the item shown in the image (such as item information record 402a). The computer may compare the tag data obtained from the price tag with information in the item information record.

In some scenarios, the customer may "checkout" and pay for the item when the customer picks up the item from a store shelf. For example, the price tag may be scanned when the customer picks up the item, and the customer may pay for item on the spot, without having to use a checkout register located by an exit of the retail store. The customer may then proceed to deactivate the EAS element at the EAS element deactivation system, which may be located near an exit of the retail store.

Figure 10:
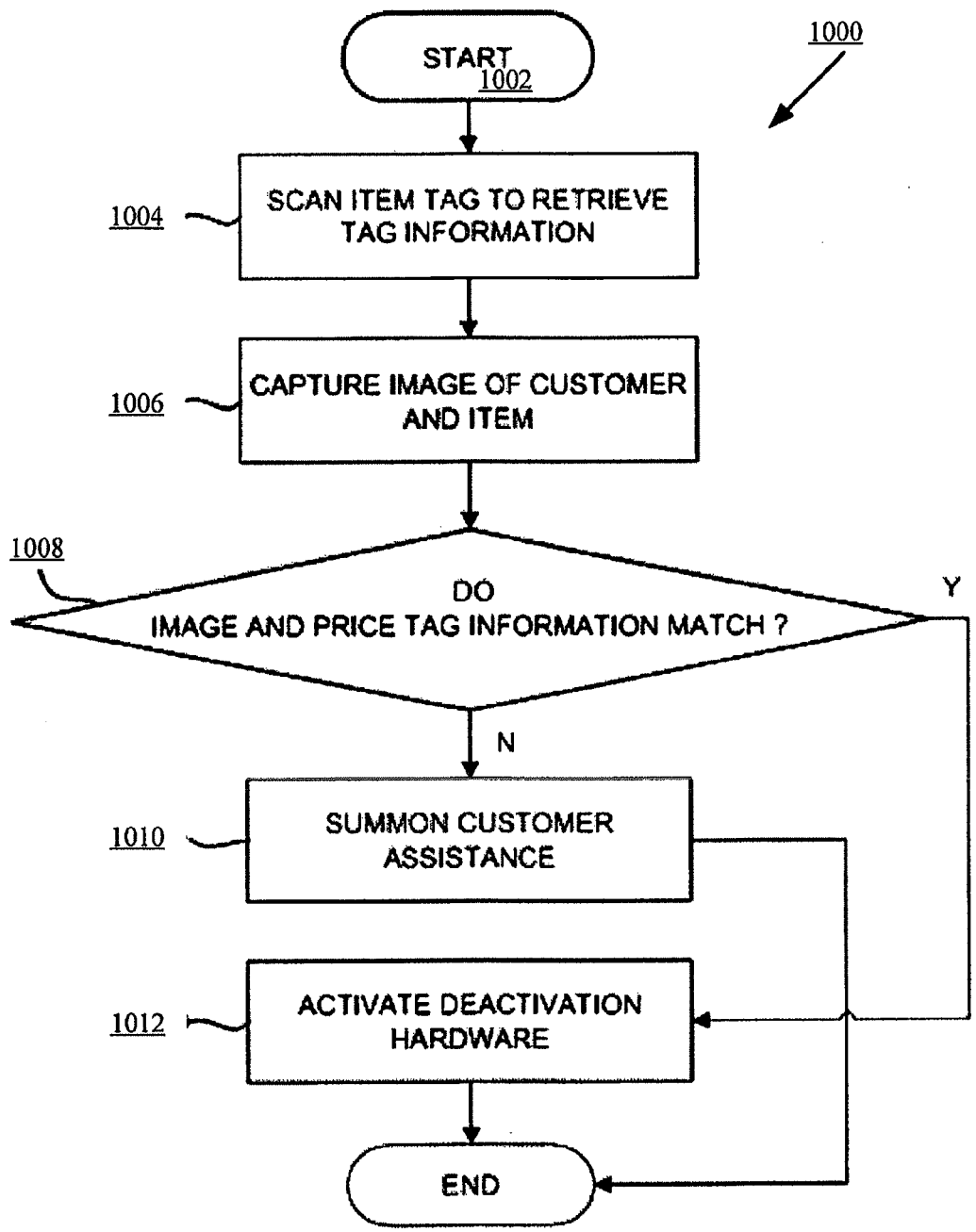
FIG. 10 is a flow chart of another exemplary process for activating an EAS element deactivator using an image of a tracked item that is useful for understanding the present invention.

Referring now to FIG. 10, there is shown a flow diagram of another exemplary method 1000 for activating the EAS element deactivator to deactivate an EAS element coupled to a tracked item. Method 1000 begins with step 1002 and continues with step 1004. In step 1004, a price tag (e.g., price tag 118 of FIG. 1) associated with an item (e.g., item 120 of FIG. 1) is scanned. The price tag scan data (e.g., tag data 122 of FIG. 1) includes price information. Next in step 1006, a camera (e.g., camera 108 of FIG. 1) captures an image (e.g., image 144 of FIG. 1) of the item which has been picked up by the customer (e.g., customer 126 of FIG. 1). The customer then proceeds to an EAS element deactivation system (e.g., system 104 of FIG. 1) where a determination is made as shown by decision step 1008. The determination is made as to whether the information obtained from the captured image matches the price information on the price tag (i.e., whether the item shown in the image corresponds to the price information shown in the price tag). If the information obtained from the image matches the price information on the price tag (i.e., the price of the item shown in the image is the price shown on the price tag) [1008:YES], then the EAS element deactivator (e.g., deactivator 114 of FIG. 1) is activated in step 1012. Else [1008:NO], a message is sent to summon customer assistance in step 1010.

In other scenarios, a shopper may be authorized to use EAS element deactivation system without supervision from a store sales associate. For example, a retailer may run a background check on the customer to determine whether the customer may be given the status of a trusted shopper (i.e., an honest customer). The computer may store a list of trusted shoppers and their images. If the computer identifies the customer as a trusted shopper, then the EAS element deactivation system is activated.

In yet other scenarios, the computer keeps track of the time periods over which each denied deactivation event occurs. A camera may be used to capture a facial image of the customer in the event a deactivation is denied. The image may be added to a report, which may be a virtual report accessible by retail loss prevention personnel. The report may also include information regarding the number of EAS elements denied deactivation, the time period over which the denial occurred, and the types of products involved in tag switching. Over time, trends and averages may be established with respect to how attempts to deactivate tags are denied.

The facial image of the customer may be analyzed during a forensic investigation of potential retail fraud activity. In the case of a confirmed retail fraud event, the facial image may be shared with law enforcement personnel. The facial image may be used as evidence of fraud committed by a customer. The report may be retrieved via a data mining feature. For example, the report may be identified by a report number. A report database storing reports may be queried using the report number. Also, the report database may be queried for potential fraud activity on a given day or over a range of dates.

Referring now to FIG. 11, there is provide a flow diagram of another exemplary method 1100 for activating the EAS element deactivator (e.g., EAS element deactivator 114 of FIG. 1) to deactivate an EAS element (e.g., EAS element 134 of FIG. 1) coupled to an item (e.g., item 120 of FIG. 1). Method 1100 will be described in relation to a purchase transaction for one or more items. The present invention is not limited in this regard. For example, method 1100 can be modified in accordance with any type of checkout transaction (e.g., a transaction for checking out a book at a library).

As shown in FIG. 11A, method 1100 begins with step 1102 and continues with optional step 1104. In optional step 1104, a portable customer-specific media (e.g., a loyalty card) is issued to a customer from which customer-related data can be obtained via short range communications. The customer-related data can include, but is not limited to, a customer identifier, a customer account number, and/or customer authentication data (e.g., a user name, a password and/or biometric data).

In a next step 1106, operations are performed to complete a purchase transaction in which the customer successfully purchases at least one item (e.g., item 120 of FIG. 1). The purchase transaction can be achieved using a fixed self-service POS device or a mobile POS device (e.g., the POS device 128 of FIG. 1). POS operations for completing a purchase transaction are well known in the art, and therefore will not be described herein. Any known or to be known POS operations can be used herein without limitation.

Upon completing the purchase transaction, a single-use transaction code may be generated and assigned for the purchase transaction so as to provide an increased security level to a subsequent EAS element deactivation process, as shown by optional step 1108. The single-use transaction code is then provided to the customer via a printed/electronic receipt. In some scenarios, the single-use transaction code is alternatively or additionally provided to the customer via an electronic message (e.g., a text message, an electronic mail message, or a web page message) communicated to a mobile device (e.g., a mobile phone or a smart phone) thereof. The single-use transaction code may include, but is not limited to, a single-use N-digit pin number, where N is an integer. In some scenarios, the single-use transaction code is generated as a function of the customer's account number, name, user name, address, phone number, password, biometric data, token number (e.g., loyalty card identifier or RFID device identifier), mobile device identifiers, wearable electronic device signatures (e.g., signal characteristics), email address, number of visits to the store during a given period of time, and/or other customer related data. The transaction code may also be generated as a function of business related data (e.g., a store identifier, a location identifier, a personnel identifier, etc. . . . ), time related data (e.g., a date and/or time at which the purchased transaction was tendered), and/or item-related data (e.g., a product identifier, a result from combining two or more product identifiers via an algorithm, an identifier identifying the isle on which the item was located in a retail store, etc. . . . ). Additionally or alternatively, the single-use transaction code is generated in accordance with a pseudo-random or chaotic number generation algorithm. Pseudo-random or chaotic number generation algorithms are well known in the art, and therefore will not be described herein. Any known or to be known pseudo-random or chaotic number generation algorithm can be used herein without limitation.

In a next step 1110, transaction data is stored in a database (e.g., database 132 of FIG. 1) so as to be associated with the particular customer. The transaction data uniquely identifies the purchase transaction completed in previous step 1106 and identifies the item(s) purchased by the customer during the purchase transaction. In this regard, the transaction data may comprise the single-use transaction code, an identifier for each purchased item, a purchase price for each purchased item, a date on which the purchase transaction was tendered, a store location where each item was purchased, and/or other information specifying one or more characteristics of each purchased item (e.g., an item name, an item description, an item shape, item specifications, an item color, an item size, an item image, an item brand, etc. . . . ). The transaction data can be stored in an item information record (e.g., item information record 402a of FIG. 4) and/or a customer information record (e.g., customer information record 402a, . . . , 402n of FIG. 4). The customer information record can include, but is not limited to, a customer identifier, a customer account number, customer contact information, and information regarding prior and/or current purchase activities by the customer.

Thereafter in optional step 1112, the customer brings the portable customer-specific media (e.g., a loyalty card) and/or a mobile device (e.g., smart phone or a wearable sensing device, such as earphones or wrist band) thereof in range of a communication device (e.g., scanner 110 of FIG. 1 or an RF transceiver) of an EAS element deactivation system (e.g., system 104 of FIG. 1). In turn, the EAS element deactivation system obtains the customer-related data from the portable customer-specific media, unique identifier data from the customer's mobile device and/or authentication data from the customer, as shown by optional step 1114. The unique identifier can include, but is not limited to, a network address for the customer's mobile device, an electronic identifier associated with the customer, and/or at least one signal characteristic for the device (e.g., a frequency). For example, an IP address, a MAC address, and/or a port number can be obtained from the customer's mobile device and used to identify the customer for purposes of allowing or denying deactivation of an EAS element of an item. This scenario has certain advantages, such as significantly decreasing the cost and hardware/software intensity as compared to systems employing loyalty cards or other physical customer assigned tokens.

Steps 1112 and 1114 can be performed in scenarios where the customer's identity is to be subsequently verified and/or authenticated so as to ensure that the correct customer is attempting to deactivate EAS elements of purchased item(s) associated with a particular purchase transaction and/or purchase receipt (e.g., purchase receipt 140 of FIG. 1). In some cases, the customer's identity can be verified and/or authenticated using a customer identifier and/or an account number obtained from the portable customer-specific media (e.g., a loyalty card), a device identifier (e.g., a MAC address) obtained from the customer's mobile communication device and/or other customer authentication data input by the customer obtained in step 1116.

The customer authentication information obtained in step 1116 can include, but is not limited to, a password and/or biometric data. The customer authentication information can be obtained via user software interactions facilitated by a user input of the EAS element deactivation system and/or a user interface of the customer's mobile device (e.g., a smart phone). Step 1116 may be performed to ensure that the correct person is in possession of the portable customer-specific media and/or mobile communication device (e.g., a smart phone).

In optional step 1118, receipt information is obtained by the EAS element deactivation system from the printed or electronic receipt. The receipt information may be encoded in a barcode contained within or on the printed or electronic receipt. A scanner (e.g., scanner 110 of FIG. 1) may read the barcode from the printed or electronic receipt. The receipt information may include a transaction code, a customer identifier, a time of purchase transaction, a location of purchase transaction, purchased item identifiers, and other transaction related information. Additionally or alternatively, the receipt information can be obtained from a receipt sent to the EAS element deactivation system without ever being viewed by and/or provided to the customer.

Subsequently, method 1100 continues with step 1120 where the customer-related information, unique identifier data, receipt information, customer authentication information and/or a unique identifier of the EAS element deactivation system are communicated to a remotely located computing device (e.g., computer 102 of FIG. 1). At the computing device, operations are performed to confirm that the customer has recently successfully completed a purchase transaction and the EAS element(s) of the purchased item(s) has(have) not yet been deactivated, as shown by step 1122 of FIG. 11B. This confirmation is achieved using the data received by the computing device from the EAS element deactivation system. For example, the computing device may compare the received data with stored data relating to the customer and/or purchased item.

Next in step 1124, the computing device performs operations to obtain first item identification data stored in a database (e.g., database 132 of FIG. 1). The first item identification data identifies one or more items with EAS elements which may be deactivated by the customer. In some scenarios, the first identification data includes a list of item identifiers specifying items approved for deactivation by the customer from the remote computing device to the EAS element deactivation system. In other scenarios, the first identification data includes images of items and/or information indicating one or more physical characteristics of the items (e.g., size, color, brand, etc. . . . ). The first item identification data is then communicated from the computing device to the EAS element deactivation system for use during a subsequent EAS element deactivation process. The EAS element deactivation process is performed in steps 1128-1140 of FIG. 11B. Notably, the present invention is not limited to the exact particulars of the EAS deactivation process described in FIG. 11B. For example, steps 1128-1140 may be replaced with some or all of the steps of previously described methods 600, 700, 800, 900 and/or 1000.

Figure 11B:
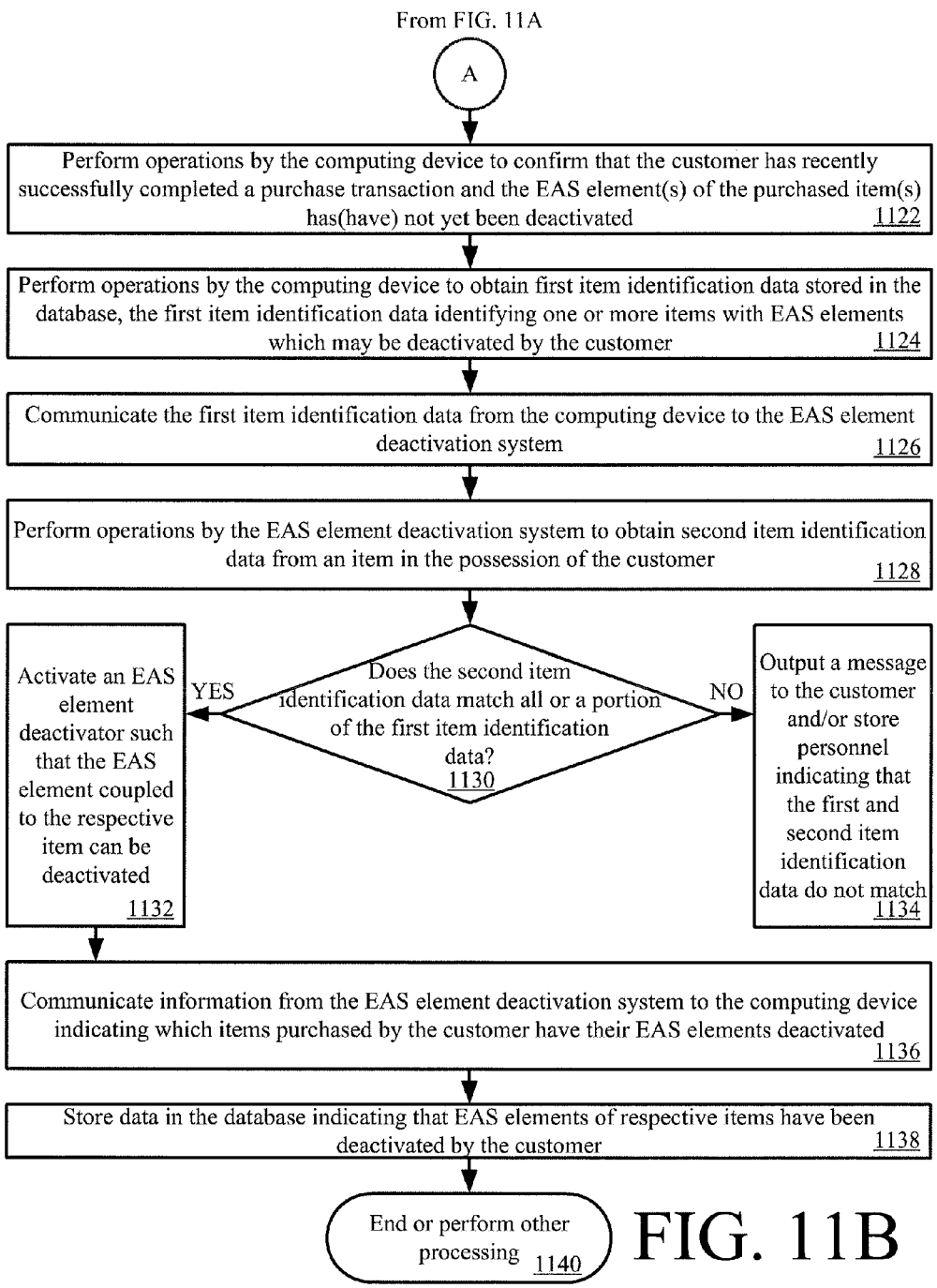

As shown in FIG. 11B, step 1128 involves obtaining second item identification data from an item in the possession of the customer. In some scenarios, the second item identification data includes a string of digits uniquely identifying the item. As such, the second item identification data can be obtained by scanning a barcode printed on or affixed to the item and/or a price tag (e.g., price tag 118 of FIG. 1) coupled to the item. Additionally or alternatively, the second item identification data comprises an image of items and/or information indicating one or more physical characteristics of the items (e.g., size, color, brand, etc. . . . ). In this case, the second item identification data can be obtained via a camera and/or other sensor devices.

The second item identification data is then used in a decision step 1130 to determine whether it matches all or a respective portion of the first item identification data. If the second item identification data does not match all or a portion of the first item identification data [1130:NO], then step 1134 is performed where a message is output to a customer and/or store personnel indicating that the first and second item identification data does not match. In contrast, if the second item identification data does match all or a portion of the first item identification data [1130:YES], then step 1132 is performed wherein an EAS element deactivator (e.g., EAS element deactivator 114 of FIG. 1) is activated such that the EAS element coupled to the respective item can be deactivated. Once the EAS element has been deactivated, step 1136 is performed. Step 1136 involves communicating information from the EAS element deactivation system to the computing device indicating which items purchased by the customer have their EAS elements deactivated. This information is stored in the database as shown by step 1138. Thereafter, step 1140 is performed where method 1100 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for activating an Electronic Article Surveillance ("EAS") element deactivator configured to deactivate an EAS element, comprising:

obtaining, by an EAS element deactivation system, customer-related data from a customer of a business organization who is attempting to deactivate an EAS element of at least one item;

obtaining, by an EAS element deactivation system, transaction data directly from a receipt previously issued upon completion of a checkout transaction for the customer;

communicating the customer-related data, the transaction data and a unique identifier for the EAS element deactivation system from the EAS element deactivation system to a remote computing device;

processing, by the remote computing device, the customer-related data and the transaction data to obtain confirmation that the customer has recently successfully completed the checkout transaction for the item and the EAS element of the item has not yet been deactivated; and activating the EAS element deactivator of the EAS element deactivation system subsequent to when the confirmation is obtained.

2. The method according to claim 1, wherein the customer-related data is obtained from portable customer-specific media via a short range communication.

3. The method according to claim 1, wherein the customer-related data comprises a unique identifier assigned to a mobile communication device possessed by the customer.

4. The method according to claim 1, wherein the transaction data comprises a single-use transaction code uniquely identifying the purchase transaction.

5. The method according to claim 4, wherein the single-use transaction code is generated as a function of customer-related data, business-related data, time-related data or item data.

6. The method according to claim 4, wherein the single-use transaction code is generated in accordance with a pseudo random or chaotic number generation algorithm.

7. The method according to claim 1, further comprising providing first item identification data specifying items approved for deactivation by the customer from the remote computing device to the EAS element deactivation system, when the confirmation is obtained.

8. The method according to claim 7, further comprising obtaining, by the EAS element deactivation system, second item identification data from an item possessed by the customer.

9. The method according to claim 8, further comprising determining if the first item identification data matches the second identification data.

10. The method according to claim 9, wherein the EAS element deactivator is activated when the first and second identification data match each other.

11. A system, comprising:
an EAS element deactivation system configured to deactivate an EAS element which
obtains customer-related data from a customer of a business organization who is attempting to deactivate an EAS element of at least one item,
obtains transaction data directly from a receipt previously issued upon completion of a checkout transaction for the customer, and
communicates the customer-related data, transaction data and a unique identifier for the EAS element deactivation system to a remote computing device; and
said remote computing device processing the customer-related data and transaction data to obtain confirmation that the customer has recently successfully completed the checkout transaction for the item and the EAS element of the item has not yet been deactivated;
wherein an EAS element deactivator of the EAS element deactivation system is activated subsequent to when the confirmation is obtained.

12. The system according to claim 11, wherein the customer-related data is obtained from portable customer-specific media via a short range communication.

13. The system according to claim 11, wherein the customer-related data comprises a unique identifier assigned to a mobile communication device possessed by the customer.

14. The system according to claim 11, wherein the transaction data comprises a single-use transaction code uniquely identifying the purchase transaction.

15. The system according to claim 14, wherein the single-use transaction code is generated as a function of customer-related data, business-related data, time-related data or item-related data.

16. The system according to claim 14, wherein the single-use transaction code is generated in accordance with a pseudo random or chaotic number generation algorithm.

17. The system according to claim 11, wherein the remote computing device further provides first item identification data specifying items approved for deactivation by the customer to the EAS element deactivation system, when the confirmation is obtained.

18. The system according to claim 17, wherein the EAS element deactivation system further obtains second item identification data from an item possessed by the customer.

19. The system according to claim 18, wherein the EAS element deactivation system further determines if the first item identification data matches the second identification data.

20. The system according to claim 19, wherein the EAS element deactivator is activated when the first and second identification data match each other.

* * * * *